(12) United States Patent
Agrawal et al.

(10) Patent No.: US 11,904,295 B2
(45) Date of Patent: Feb. 20, 2024

(54) THIOL-FUNCTIONALIZED HYPER-CROSSLINKED POLYMERS WITH HIERARCHICAL POROSITIES FOR THE CAPTURE AND RECOVERY OF HEAVY METAL CONTAMINANTS

(71) Applicant: Northwestern University, Evanston, IL (US)

(72) Inventors: Ananya M. Agrawal, Mumbai (IN); SonBinh T. Nguyen, Evanston, IL (US); Sanjiban Chakraborty, Fremont, CA (US)

(73) Assignee: Northwestern University, Evanston, IL (US)

( * ) Notice: Subject to any disclaimer, the term of this patent is extended or adjusted under 35 U.S.C. 154(b) by 624 days.

(21) Appl. No.: 17/043,372

(22) PCT Filed: May 29, 2019

(86) PCT No.: PCT/US2019/034258
§ 371 (c)(1),
(2) Date: Sep. 29, 2020

(87) PCT Pub. No.: WO2019/231956
PCT Pub. Date: Dec. 5, 2019

(65) Prior Publication Data
US 2021/0121851 A1 Apr. 29, 2021

Related U.S. Application Data

(60) Provisional application No. 62/677,485, filed on May 29, 2018.

(51) Int. Cl.
B01J 20/26 (2006.01)
B01J 20/28 (2006.01)
B01J 20/30 (2006.01)
C02F 1/28 (2023.01)
(Continued)

(52) U.S. Cl.
CPC ....... B01J 20/267 (2013.01); B01J 20/28064 (2013.01); B01J 20/28083 (2013.01);
(Continued)

(58) Field of Classification Search
None
See application file for complete search history.

(56) References Cited

U.S. PATENT DOCUMENTS 3,729,457 A 4/1973 Davankov
4,191,813 A 3/1980 Reed et al.
(Continued)

FOREIGN PATENT DOCUMENTS

EP 3069787 A1 9/2016

OTHER PUBLICATIONS

Faghini et al. (Polymer, 2017, 128, 31-39). (Year: 2017).*
(Continued)

Primary Examiner — Clare M Perrin
(74) Attorney, Agent, or Firm — Bell & Manning, LLC

(57) ABSTRACT

Thiol-functionalized, hyper-crosslinked vinylbenylchloride-divinybenzene (VBC-DVB) copolymers having high mesopore volumes are provided. Also provided are methods of making the hyper-crosslinked copolymers and methods of using the hyper-crosslinked copolymers in the capture and remediation of metals, including heavy metals.

16 Claims, 19 Drawing Sheets

(51) Int. Cl.
    *C08F 8/34*     (2006.01)
    *C08F 212/14*   (2006.01)
    *C02F 101/20*   (2006.01)
    *C08F 112/14*   (2006.01)

(52) U.S. Cl.
    CPC ........... *B01J 20/3085* (2013.01); *C02F 1/285* (2013.01); *C08F 8/34* (2013.01); *C08F 212/30* (2020.02); *C02F 2101/20* (2013.01); *C08F 112/18* (2020.02); *C08F 2800/10* (2013.01); *C08F 2810/20* (2013.01)

(56) References Cited

U.S. PATENT DOCUMENTS

| | | | |
|---|---|---|---|
| 6,203,708 | B1 | 3/2001 | Lawson et al. |
| 2003/0027879 | A1 | 2/2003 | Davankov et al. |
| 2010/0326847 | A1 | 12/2010 | Jonschker et al. |
| 2018/0050328 | A1 | 2/2018 | Zhang et al. |

OTHER PUBLICATIONS

Li et al., "Mercury nano-trap for effective and efficient removal of mercury (II) from aqueous solution," Nature Communications May 2014:5537, pp. 1-7.

Liu et al., "Selective isolation of gold facilitated by second-sphere coordination with alpha-cyclodextrin," Nature Communications Apr. 2013:1855, pp. 1-9.

Xu et al., "Recent Development of Hypercrosslinked Microporous Organic Polymers," Macromolecular Rapid Commun. 2013, vol. 34, pp. 471-484.

Braslau et al., "Reversible crosslinking of polymers bearing pendant or terminal thiol groups prepared by nitroxide-mediated radical polymerization," Reactive & Functional Polymers (2013), vol. 73, pp. 624-633.

Gokmen et al., "Porous polymer particles—A comprehensive guide to synthesis, characterization, functionalization and applications," *Progress in Polymer Science*, vol. 37, pp. 365-405. Doi 10.1016/j.progpolymsci.2011.07.006.

Li et al., "Tailoring the pore size of Hypercrosslinked polymers," Soft Matter, 2011, vol. 7, pp. 10910-10916.

Lezzi et al., "Synthesis of Thiol Chelating Resins and Their Adsorption Properties toward Heavy Metal Ions," Journal of Polymer Science: Part A: A Polymer Chemistry (1994), vol. 32, pp. 1877-1883.

Jou-Hyeon Ahn et al., "Rapid Generation and Control of Microporosity, Bimodal Pore Size Distribution, and Surface Area in Davankov-Type Hyper-Cross-Linked Resins," Macromolecules 2006, vol. 39, pp. 627-632.

\* cited by examiner

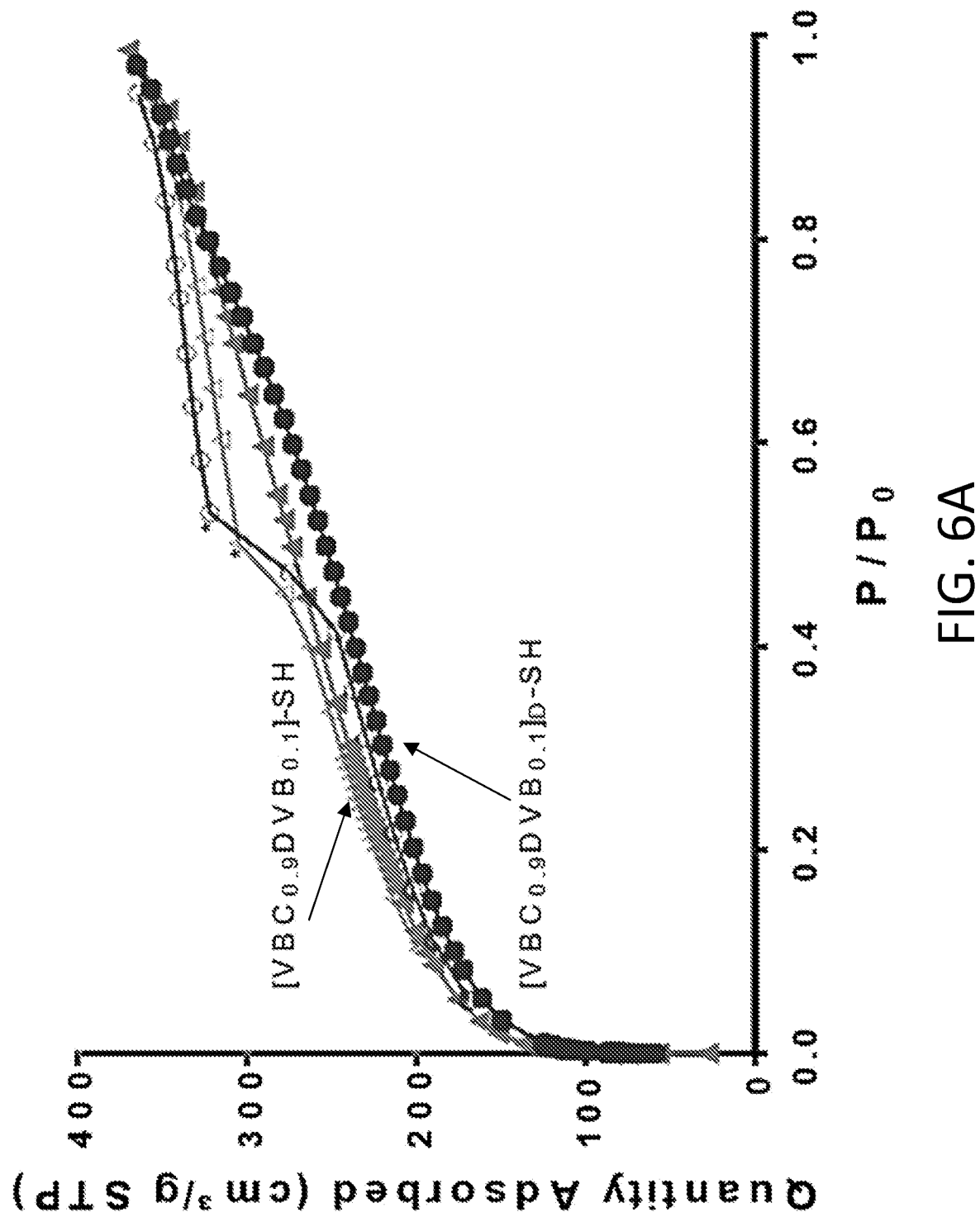

THIOL-FUNCTIONALIZED HYPER-CROSSLINKED POLYMERS WITH HIERARCHICAL POROSITIES FOR THE CAPTURE AND RECOVERY OF HEAVY METAL CONTAMINANTS

CROSS-REFERENCE TO RELATED APPLICATIONS

This application is a National Stage of International Application No. PCT/US19/34258, filed May 29, 2019, which claims the benefit of U.S. Patent Application No. 62/677,485, filed May 29, 2018, the contents of which are herein incorporated by reference.

REFERENCE TO GOVERNMENT RIGHTS

This invention was made with government support under HDTRA 1-14-1-0014 awarded by the DTRA. The government has certain rights in the invention.

BACKGROUND

The ever-rising global demand for gold has prompted extensive research into efficient methods for gold purification and recovery with minimal environmental impacts. Current methods for extracting mined gold and/or recovery of gold from industrial and electronic wastes often involve corrosive acids or toxic cyanide salts, which cause major environmental and toxicity problems. While less-toxic leaching agents, including thiourea, thiosulfates, and halides, have been proposed as alternatives, they are not particularly effective at forming gold-anion complexes that are readily separable from impurities.

BRIEF DESCRIPTION OF THE DRAWINGS

Illustrative embodiments of the invention will hereafter be described with reference to the accompanying drawings, wherein like numerals denote like elements.

FIG. 2 further depicts chloromethylation of 2, followed by thiol-functionalization using either strategy IVa or IVb, which affords the desired HCP—SH (structures 4 and 5).

FIG. 4A shows the data for $[VBC_{0.8}DVB_{0.2}]$—SH and $[VBC_{0.8}DVB_{0.2}]_D$—SH; FIG. 4B shows the data for $[VBC_{0.9}DVB_{0.1}]$—SH and $[VBC_{0.9}DVB_{0.1}]_D$—SH; FIG. 4C shows the data for $[VBC_{0.946}DVB_{0.054}]$—SH and $[VBC_{0.946}DVB_{0.054}]_D$—SH; and FIG. 4D shows the data for $[VBC_{0.9}DVB_{0.04}]$—SH and $[VBC_{0.96}DVB_{0.04}]_D$—SH. The corresponding lines are only included as visual guides. While the adsorption efficacies of the HCP—SHs were initially evaluated at a high Au/S ratio of 5 to allow complete saturation of the —SH binding sites, the rapid initial $Au^1$ uptake (~80% of equilibrium adsorption capacity was reached within the first two minutes) rendered this ratio unsuitable for obtaining adsorption kinetic information. Thus, the Au/S ratio was lowered to 0.97 to slow down the uptake rate.

FIGS. 6A-6D depict nitrogen adsorption isotherms (FIGS. 6A and 6C) and pore-size distribution graphs (FIGS. 6B and 6D) for $[VBC_{0.9}DVB_{0.1}]_D$—SH and $[VBC_{0.9}DVB_{0.1}]$—SH and for $[VBC_{0.946}DVB_{0.054}]$—SH and $[VBC_{0.946}DVB_{0.054}]_D$—SH in the Example. Closed symbols: adsorption; open symbols: desorption. Points marked with an asterisk (*) are artifacts produced by the instrument during $N_2$ desorption as a result of the tensile strength effect.

DETAILED DESCRIPTION

Figure 1:
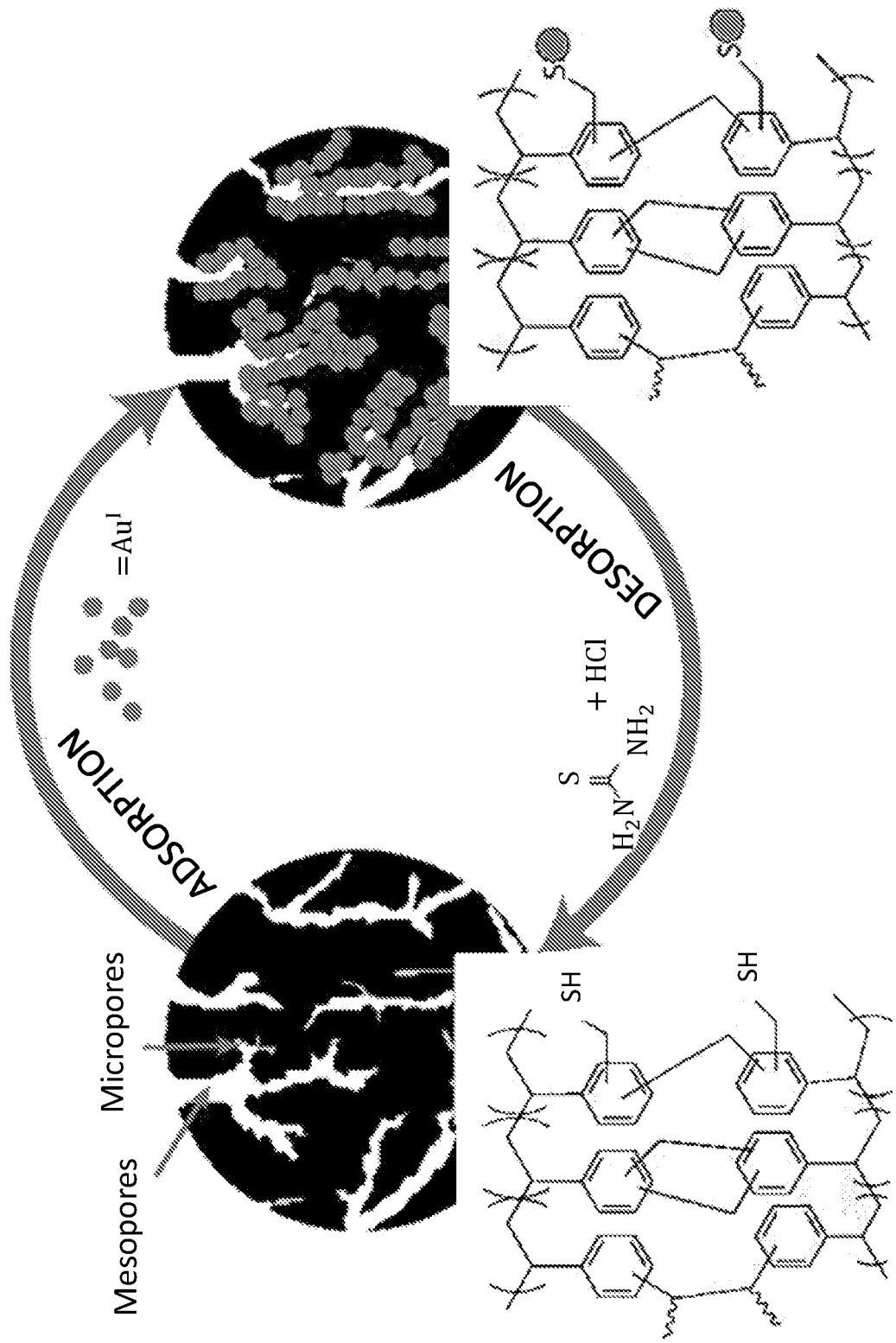
FIG. 1 depicts an illustration of the gold adsorption-desorption cycle carried out on a thiol-functionalized hyper-crosslinked polymer (HCP—SH). From top to bottom: an HCP—SH resin with a broad range of pore sizes is exposed to a solution of $Au^1$ ions which adsorb to thiol binding sites (see inset). These adsorbed $Au^1$ ions can then be desorbed by exposing the resin to a solution of thiourea in HCl.

Thiol-functionalized, hyper-crosslinked vinylbenzylchloride-divinylbenzene (VBC-DVB) copolymers having high mesopore volumes are provided. Also provided are methods of making the hyper-crosslinked copolymers and methods of using the hyper-crosslinked copolymers in the remediation of metals, including heavy metals.

The hyper-crosslinked VBC-DVB copolymers are low-density, highly porous materials with hierarchical porosities that include both mesopores and micropores and may have a bimodal pore size distribution, wherein the mesopore volume makes up a substantial percentage of the total pore volume in the material. By way of illustration, in some embodiments of the thiol-functionalized, hyper-crosslinked VBC-DVB copolymers, the volume of the mesopores accounts for at least 40% of the total pore volume in the material. This includes embodiments of the copolymers in which the volume of the mesopores accounts for at least 45% of the total pore volume in the material. For example, the mesopore volume may account for between 40% and 60%, including between 45% and 55%, of the total pore volume of the material.

For the purposes of this disclosure, micropores are pores having pore sizes of 2 nm or lower, and mesopores are pores having pore sizes greater than 2 nm but generally smaller than 100 nm and, more typically, no greater than 50 nm. The total pore volume, mesopore volume, and micropore volume of the copolymers can be measured using the slit-pore $N_2$ non-local density functional theory (NL-DFT) model described in Cychosz et al., *Chem. Soc. Rev.* 2016, 45, 3400-3400 and illustrated in the Example.

The highly porous nature of the materials provides them with high surface areas. For example, thiol-functionalized, hyper-crosslinked VBC-DVB copolymers having Brunauer-Emmett-Teller (BET) surface area of at least 500 $m^2/g$, at least 600 $m^2/g$, and at least 700 $m^2/g$, can be synthesized. By way of illustration, some embodiments of the VBC-DVB copolymers have BET surface areas in the range from 500 $m^2/g$ to 900 $m^2/g$.

The hyper-crosslinked copolymers can be synthesized using a process that employs inexpensive VBC and DVB comonomers and a thiourea-based functionalization strategy. By using a thiourea-based route to functionalize the crosslinked copolymers, the formation of inactive disulfide and thioester bonds is avoided, as is the oxidation of the thiol groups. The synthesis can be easily modulated to produce copolymers with tailorable pore size distributions by adjusting the comonomer proportions and/or by employing a porogenic solvent, such as a dioxane, tetrahydrofuran (THF), toluene, xylenes, or mixtures of two or more thereof, during the VBC/DVB free-radical copolymerisation step. While both can tune the micropore/mesopore ratios and BET surface areas in the VBC-DVB copolymers, employing a porogenic solvent is particularly effective at promoting mesoporosity in high-DVB formulations which would otherwise be predominantly microporous, and increasing the size of mesopores in low-DVB materials.

One embodiment of a method for forming a hyper-crosslinked copolymer includes the steps of: (1) copolymerizing VBC monomers and DVB monomers into a VBC-DVB copolymer in the presence of a porogenic solvent; (2) crosslinking the VBC-DVB copolymer; (3) chloromethylating the VBC-DVB copolymer to form a chloromethylated VBC-DVB copolymer; and (4) thiolating the chloromethylated VBC-DVB copolymer using a thiourea to form the thiol-functionalized crosslinked VBC-DVB copolymer. The crosslinking and/or thiolation steps can also be carried out in a porogenic solvent. The extensive crosslinking of the benzyl groups of the copolymers leads to the introduction of a large number of pores into the polymeric material, and the resulting porous crosslinked copolymers can be referred to as hyper-crosslinked.

A high VBC content in the copolymers provides high mesoporosity and can enhance metal uptake by the thiol-functionalized VBC-DVB copolymers, as discussed below. Therefore, the VBC-DVB copolymers will typically have a polymerized VBC monomer content of at least 80 mol % and a DVB monomer content of no more than 20 mol %. This includes VBC-DVB copolymers having a polymerized VBC monomer content of at least 90 mol % and a polymerized DVB monomer content of no more than 10 mol %, further includes VBC-DVB copolymers having a polymerized VBC monomer content of at least 95 mol % and a polymerized DVB monomer content of no more than 5 mol %, and still further includes VBC-DVB copolymers having a polymerized VBC monomer content of at least 98 mol % and a polymerized DVB monomer content of no more than 2 mol %. By way of illustration, some embodiments of the VBC-DVB copolymers have a VBC monomer content in the range from 80 mol % to 99.5 mol % and a DVB monomer content in the range from 0.5 mol % to 20 mol %.

In addition to the VBC and DVB monomers, one or more additional monomers, such as styrene and substituted styrenes, can be polymerized into the VBC-DVB copolymer to provide a final polymer with desired properties. These additional monomers, if present, will typically be added in a range of 0-100 mol % of the VBC monomer.

The large BET surface areas, low densities, and water stabilities of the hyper-crosslinked copolymers render them well-suited for use in metal remediation applications. Moreover, their broad and bimodal pore size distributions provide the hyper-crosslinked copolymers with superior adsorption capacities and kinetics, relative to their purely or predominantly microporous counterparts. Without intending to be bound to any particular theory of the inventions, the improved adsorption properties of the copolymers may be attributed to the micropores ensuring that all, or substantially all, binding sites are accessible, thus yielding high adsorption capacity, while the mesopores facilitate rapid mass transport. This combination of fast transport kinetics and high adsorption capacity enables the efficient capture and release of metal ions, including heavy metal ions from samples (e.g., aqueous solutions) containing the metal ions.

One embodiment of a method for removing metal ions from a sample includes the following steps: contacting a thiol-functionalized crosslinked VBC-DVB copolymer with a sample comprising metal ions, whereby the metal ions are adsorbed by the thiol-functionalized crosslinked VBC-DVB copolymer; and removing the thiol-functionalized crosslinked VBC-DVB copolymer with the adsorbed metal ions from the sample. The VBC-DVB can be regenerated by removing the adsorbed metal ions. This can be accomplished by contacting the VBC-DVB copolymers with an acid, such as HCl, and thiourea in solution, whereby thiol ligand exchange occurs to release the adsorbed metal ions.

The thiol-functionalized crosslinked VBC-DVB copolymer can be used to remove a variety of metal ions, including heavy metal ions, from a sample. These include gold ions, silver ions, copper ions, lead ions, mercury ions, cadmium ions, or a combination of two or more thereof. These ions can be removed with high uptake.

EXAMPLE

In this Example, the preparation of several HCP—SHs with combinations of both micro-(<2 nm) and mesopores (2-50 nm) that can be used for the capture of gold ions from aqueous solutions is described. The ease of creating an HCP—SH with a broad pore size distribution (psd) affords a material that exhibits superior adsorption capacity and kinetics when compared to its purely microporous counterparts. Furthermore, the adsorbed gold can be readily removed, and the HCP—SH can be regenerated and reused several times (FIG. 1). This combination of fast kinetics, high capacity, and good stability positions the HCP—SH material described herein as an attractive candidate for $Au^1$ adsorption applications.

The HCP (FIG. 2, structure 2) was synthesized following a modified version of the procedure reported by Tan et al., with DVB content that ranged between 2, 5, 10, and 20 mol %. This affords HCPs with a psd comprising a broad range of micro- and mesopores (FIGS. 3A-3D). To maximize the mesoporosity, which should facilitate mass transport, dioxane, a solvating porogen, was also introduced into the initial free-radical polymerization step (FIG. 2, step I) for each of these four materials. The resulting set of 8 different HCP materials comprise a comprehensive library that allowed the porosity to be tuned and Au uptake kinetics and capacity to be optimized. For the remainder of this Example, the first group of HCPs will be denoted as [VBC$_x$DVB$_y$], where x and y represent the mol % of VBC or DVB used in the initial copolymerization, respectively. The corresponding dioxane-synthesized materials will be denoted as [VBC$_x$DVB$_y$]$_D$.

Figure 2:
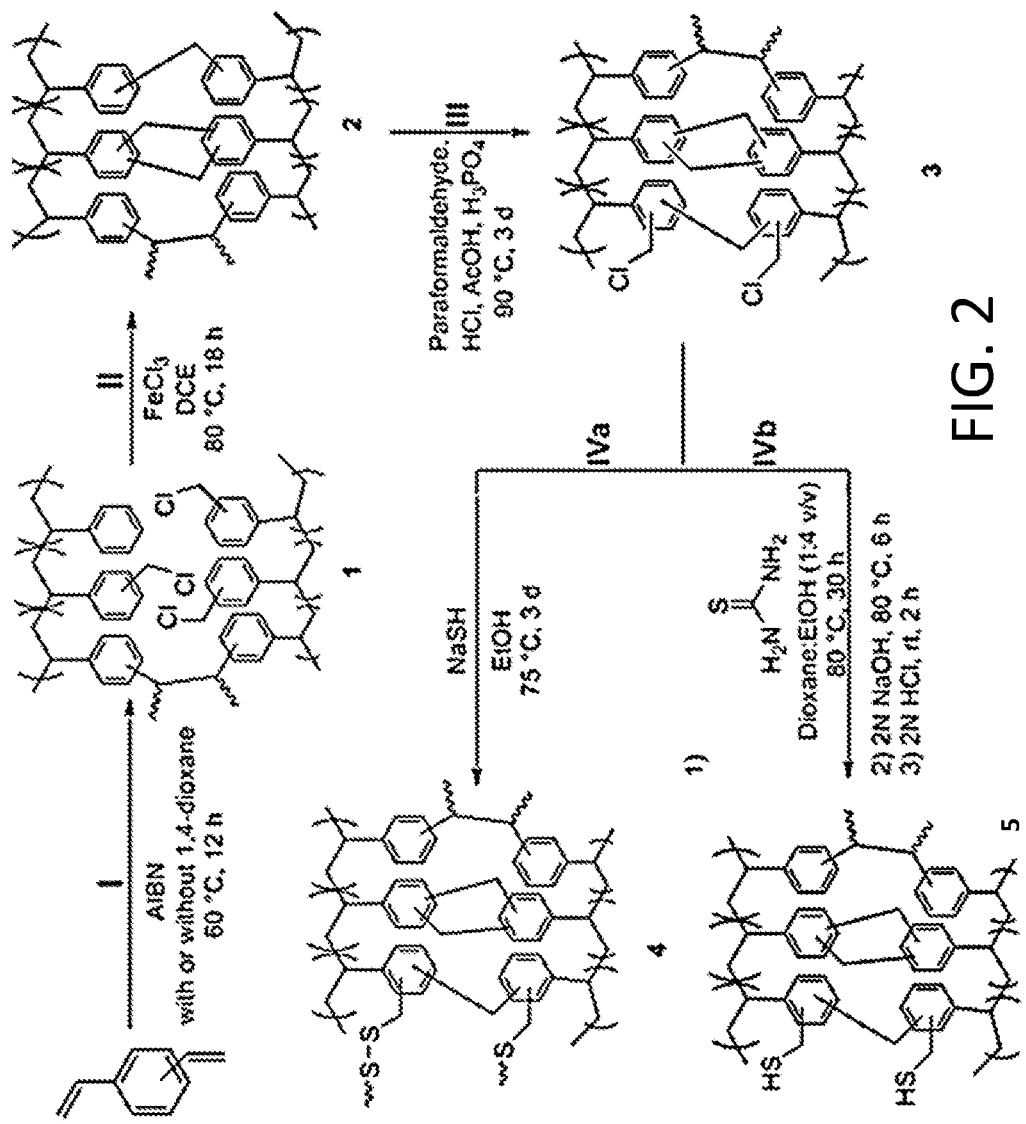
FIG. 2 depicts synthesis of the parent HCP copolymer 2. The HCP synthesized in the presence of dioxane is named as $[VBC_xDVB_y]_D$ where the subscript D indicates dioxane usage. If the subscript is absent, the free-radical polymerization was carried out neat (without dioxane).

The 8 HCPs were chloromethylated (FIG. 2, step III) and thiolated (FIG. 2, step IVb), to afford the desired HCP—SHs (FIG. 2, structure 5). These materials are denoted as [VBC$_x$DVB$_y$]$_D$—SH or [VBC$_x$DVB$_y$]—SH, depending on the initial synthesis conditions (i.e., with or without dioxane). Successful chloromethylation of the HCPs was confirmed by solid-state $^{13}$C cross-polarization, magic-angle-spinning nuclear magnetic resonance (CP-MAS NMR) spectroscopy and X-ray fluorescence (XRF) analysis, which indicated that almost all of the chloromethyl moieties were converted to thiols following the thiol-functionalization step.

Approaches toward thiol-functionalization: To obtain the desired HCP—SH materials 5, the most attractive strategy from a synthesis perspective was the direct thiolation of the chloromethylated structure 3 (specifically [VBC$_{0.8}$DVB$_{0.2}$]$_D$), through a one-step nucleophilic substitution using NaSH (FIG. 2, step IVa). However, the resulting material did not show significant Au$^1$ adsorption capacity, suggesting that deleterious side reactions may have occurred. These could include the formation of a thioether by a second halide displacement, or —SH oxidation that forms a disulfide linkage (FIG. 2, structure 4).

Figure 7A:
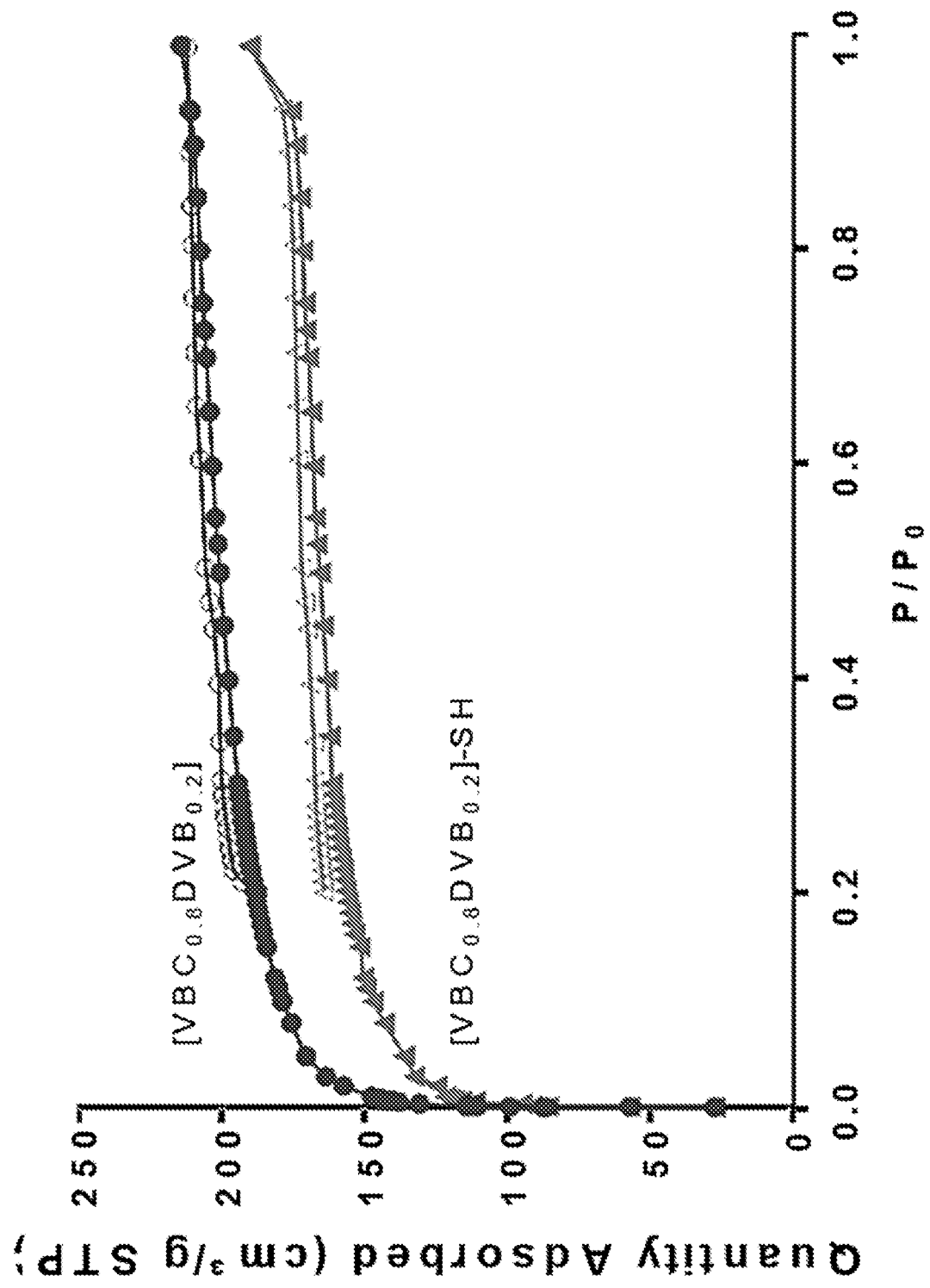
FIGS. 7A and 7B depict representative $N_2$ adsorption isotherms for two of the HCP and HCP—SH materials in the Example before and after thiol-functionalization. These data indicate that functionalization begets no major change in the overall pore structure or morphology of the HCPs; both $[VBC_{0.8}DVB_{0.2}]$ and $[VBC_{0.8}DVB_{0.2}]$—SH (FIG. 7A) are type 1b isotherms without hysteresis, while both $[VBC_{0.9}DVB_{0.1}]$ and $[VBC_{0.9}DVB_{0.1}]$—SH (FIG. 7B) are type 2b isotherms with H2 hysteresis loops. Closed symbols: adsorption; open symbols: desorption. Points marked with an asterisk (*) are artifacts produced by the instrument during $N_2$ desorption as a result of the tensile strength effect.
Figure 7B:
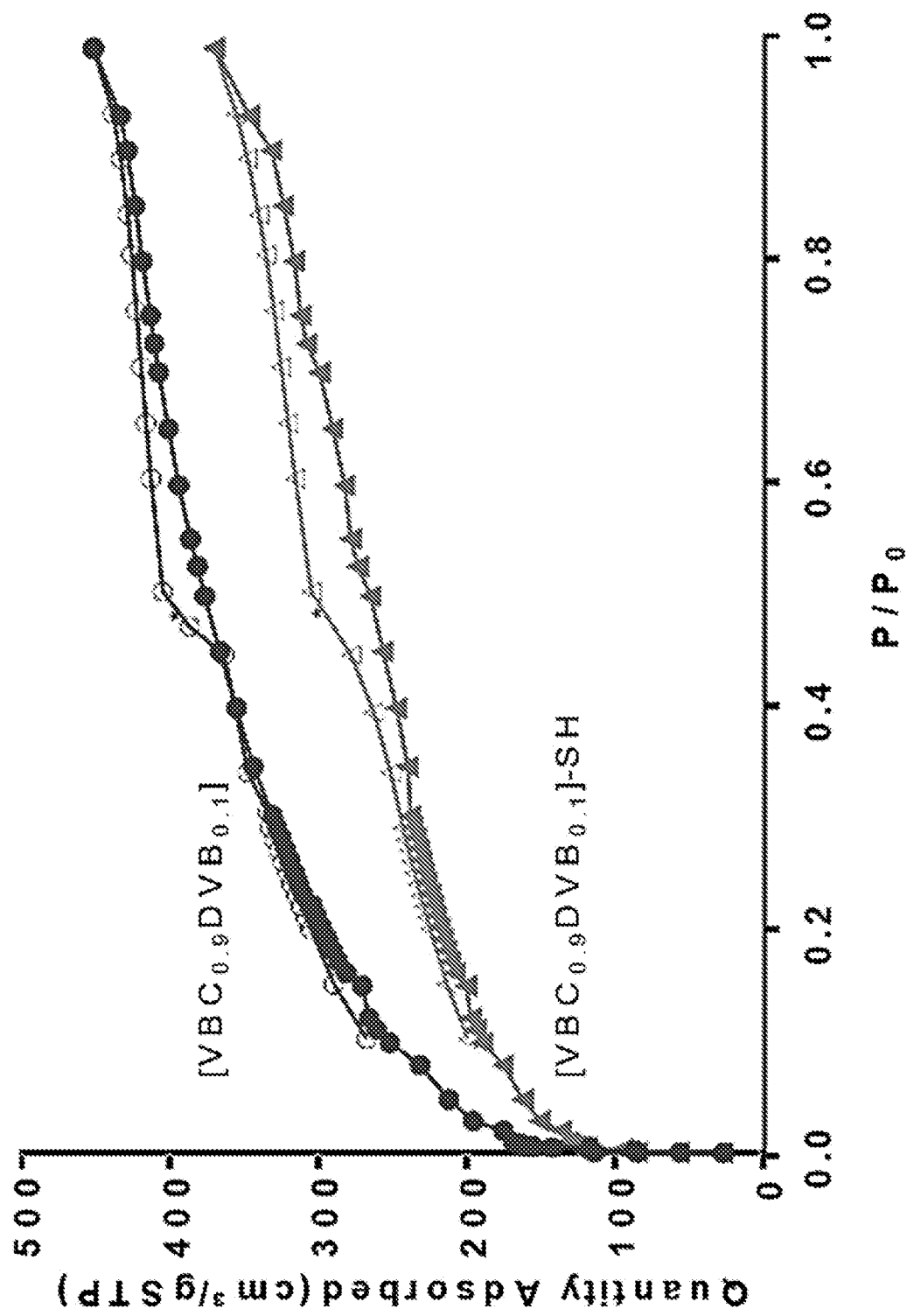

To bypass these aforementioned problems with direct thiolation, a thiourea substitution/hydrolysis protocol was employed (FIG. 2, step IVb) to produce 5. The reaction of 3 with thiourea formed a protected isothiourea intermediate that was then hydrolyzed to a thiol. Successful conversion of 3 to 5 was confirmed by XRF analysis and by X-ray photon spectroscopy (XPS). While the conversion of 3 into 5 resulted in some loss of the BET areas, the shape of the N$_2$ adsorption isotherm does not change significantly (FIGS. 7A-7B). As the resulting thiourea-derived material 5 exhibited gold adsorption capacities approaching the ideal Au/S=1 ratio, it was employed for all subsequent studies.

The Effect of Dioxane as a Porogen

In the neat HCP—SH syntheses (i.e., without dioxane in step I, FIG. 2), the [VBC$_{0.8}$DVB$_{0.2}$]—SH stands out with its high microporosity (90% of its total pore volume (tpv) is in its micropore volume (mpv)) compared to the other three formulations (49-54% of their tpv are in their mpv) (Table 1, c.f. entry 1 vs. 3, 5, and 7). This is borne out by the observation that [VBC$_{0.8}$DVB$_{0.2}$]—SH has a Type 1b N$_2$ adsorption isotherm (FIG. 3A), while the remaining three materials all exhibit Type 2b isotherms with H2 hysteresis loops and steeper adsorption branches at higher P/Po (FIG. 3C and FIGS. 6A and 6C), signifying the presence of both micro- and mesopores. As the amount of DVB in the composition decreased from 10 to 2 mol %, the BET area and the tpv of the HCP—SHs both increased while the mpv remained relatively constant (Table 1, entries 3, 5, and 7). Thus, the materials become more mesoporous as the amount of crosslinking decreases.

TABLE 1

BET area and pore volume properties (obtained using the slit-pore N$_2$ NL-DFT model) for all 8 HCP-SH materials

| Entry | HCP-SH | BET area (m$^2$/g) | Total pore volume (tpv) (cm$^3$/g) | Micropore volume (mpv) (cm$^3$/g) (% of tpv) | % change in % mpv | Mesopore volume (Mpv) (cm$^3$/g) (% of tpv) | % change in % Mpv |
|---|---|---|---|---|---|---|---|
| 1 | [VBC$_{0.8}$DVB$_{0.2}$]-SH | 590 | 0.215 | 0.194 (90%) | — | 0.021 (10%) | — |
| 2 | [VBC$_{0.8}$DVB$_{0.2}$]$_D$-SH | 540 | 0.263 | 0.141 (53%) | −69% | 0.122 (47%) | 79% |
| 3 | [VBC$_{0.9}$DVB$_{0.1}$]-SH | 780 | 0.365 | 0.198 (54%) | — | 0.167 (46%) | — |
| 4 | [VBC$_{0.9}$DVB$_{0.1}$]$_D$-SH | 690 | 0.355 | 0.167 (47%) | −15% | 0.187 (53%) | 13% |
| 5 | [VBC$_{0.946}$DVB$_{0.054}$]-SH | 910 | 0.520 | 0.257 (50%) | — | 0.262 (50%) | — |
| 6 | [VBC$_{0.946}$DVB$_{0.054}$]$_D$-SH | 760 | 0.365 | 0.179 (49%) | −2% | 0.186 (51%) | 2% |
| 7 | [VBC$_{0.96}$DVB$_{0.04}$]-SH | 1050 | 0.528 | 0.279 (53%) | — | 0.249 (47%) | — |
| 8 | [VBC$_{0.96}$DVB$_{0.04}$]$_D$-SH | 860 | 0.421 | 0.222 (53%) | 0% | 0.202 (48%) | 2% |

TABLE 2

Pore area properties (obtained using the slit-pore N$_2$ NL-DFT model) for all 8 HCP-SH materials

| Entry | HCP-SH | Total area in pores (tap) (m$^2$/g) | Micropore area (mpa)(m$^2$/g) (% of tap) | % change in % mpa | Mesopore area (Mpa) (m$^2$/g) (% of tap) | % change in % Mpa |
|---|---|---|---|---|---|---|
| 1 | [VBC$_{0.8}$DVB$_{0.2}$]-SH | 413 | 390 (94%) | — | 23 (6%) | — |
| 2 | [VBC$_{0.8}$DVB$_{0.2}$]$_D$-SH | 275 | 178 (65%) | −46% | 97 (35%) | 84% |
| 3 | [VBC$_{0.9}$DVB$_{0.1}$]-SH | 495 | 339 (68%) | — | 156 (32%) | — |
| 4 | [VBC$_{0.9}$DVB$_{0.1}$]$_D$-SH | 338 | 172 (51%) | −35% | 167 (49%) | 36% |
| 5 | [VBC$_{0.946}$DVB$_{0.054}$]-SH | 527 | 384 (73%) | — | 143 (27%) | — |
| 6 | [VBC$_{0.946}$DVB$_{0.054}$]$_D$-SH | 287 | 193 (67%) | −9% | 94 (33%) | 18% |
| 7 | [VBC$_{0.96}$DVB$_{0.04}$]-SH | 536 | 343 (64%) | — | 193 (36%) | — |
| 8 | [VBC$_{0.96}$DVB$_{0.04}$]$_D$-SH | 506 | 310 (61%) | −4% | 195 (39%) | 70% |

Figure 3A:
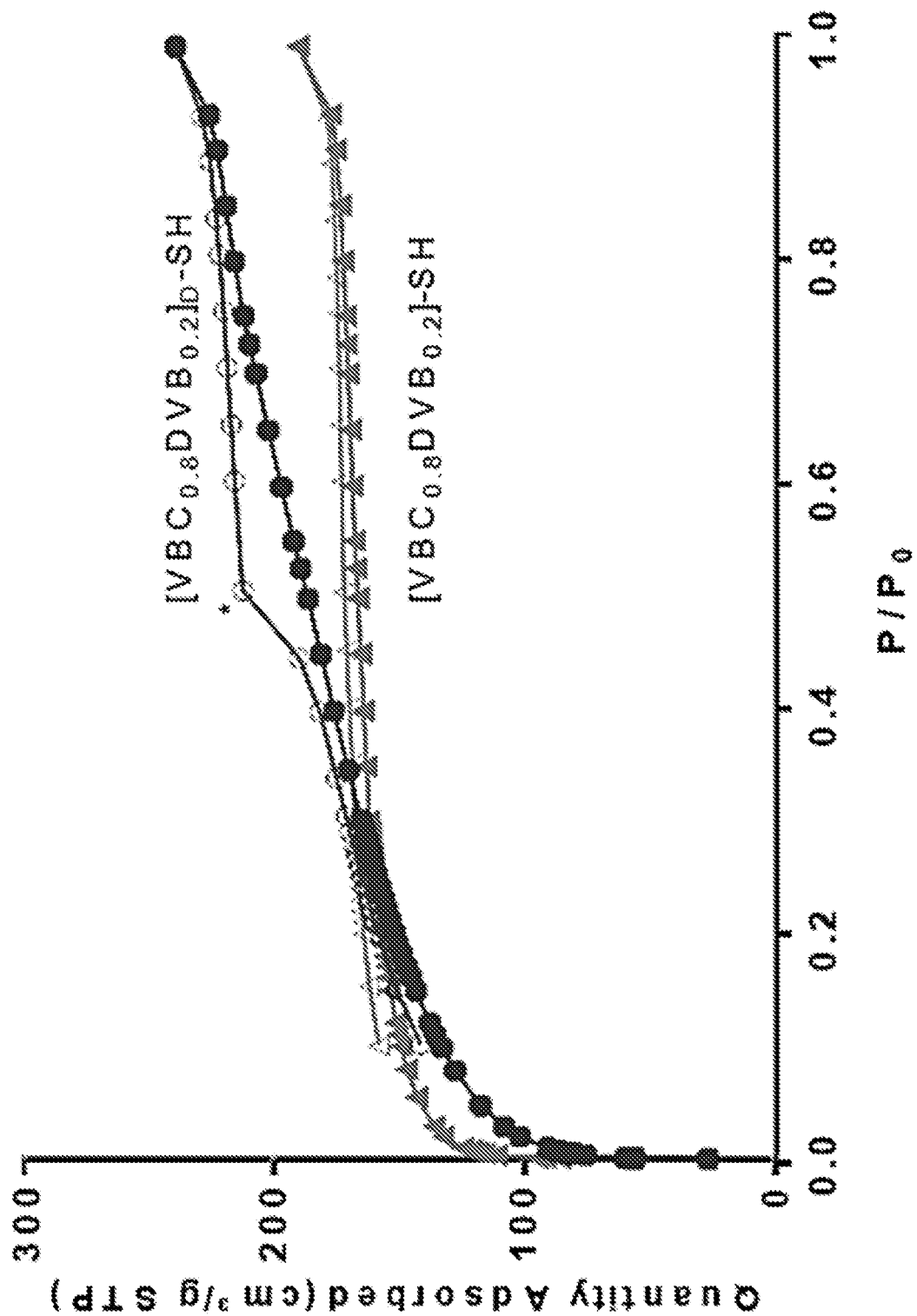
FIG. 3A depicts $N_2$ adsorption isotherms.
Figure 3B:
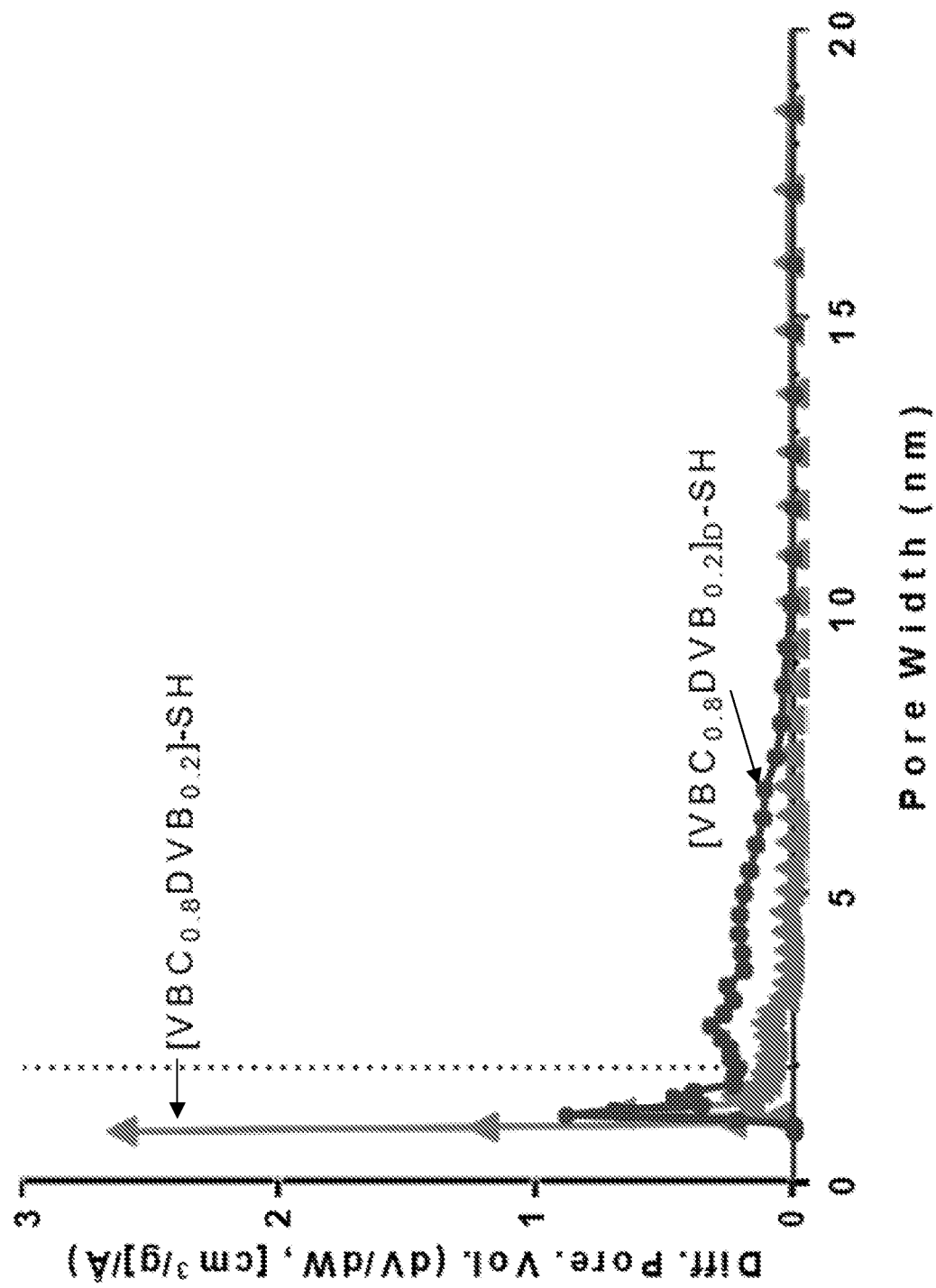
FIG. 3B depicts pore size distribution graphs for $[VBC_{0.8}DVB_{0.2}]_D$—SH and $[VBC_{0.8}DVB_{0.2}]$—SH. Closed symbols: adsorption; open symbols: desorption.
Figure 3C:
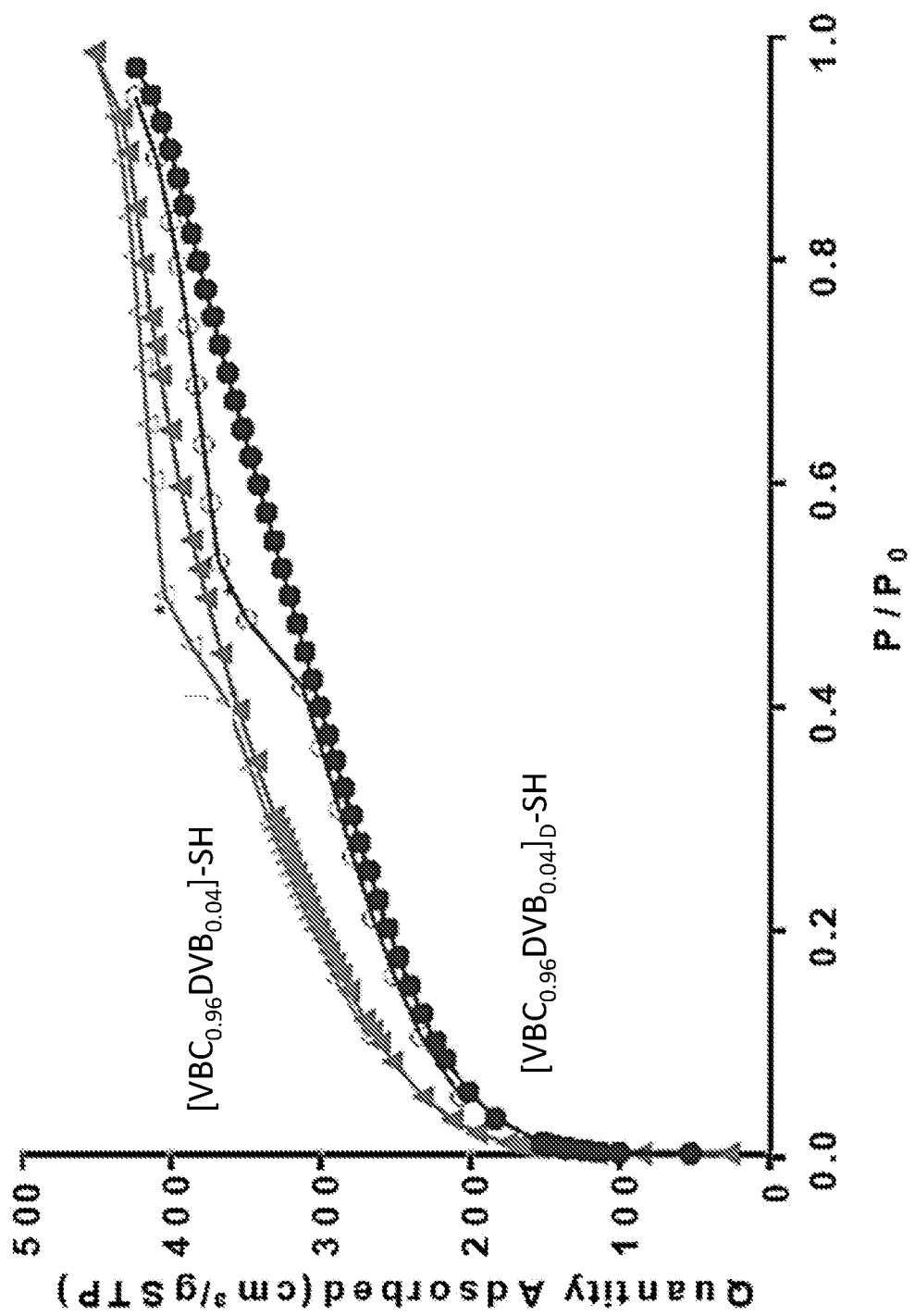
FIG. 3C depicts $N_2$ adsorption isotherms.
Figure 3D:
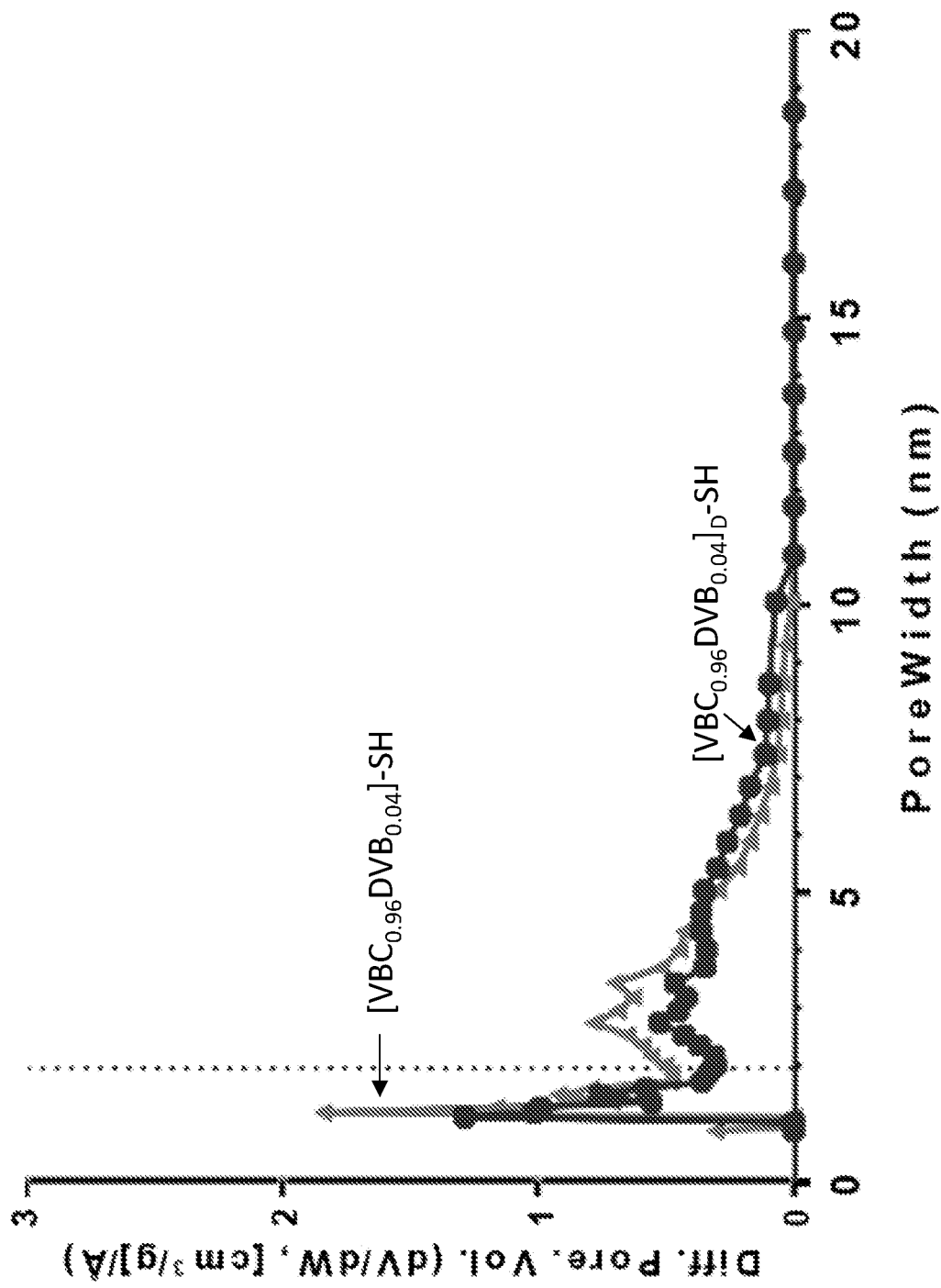
FIG. 3D depicts pore size distribution graphs for $[VBC_{0.96}DVB_{0.04}]_D$—SH and $[VBC_{0.9}DVB_{0.04}]$—SH. Points marked with an asterisk (*) are artifacts produced by the instrument during $N_2$ desorption as a result of the tensile strength effect and are not used in the calculations of surface areas and pore-size distributions in the Example.
Figure 4A:
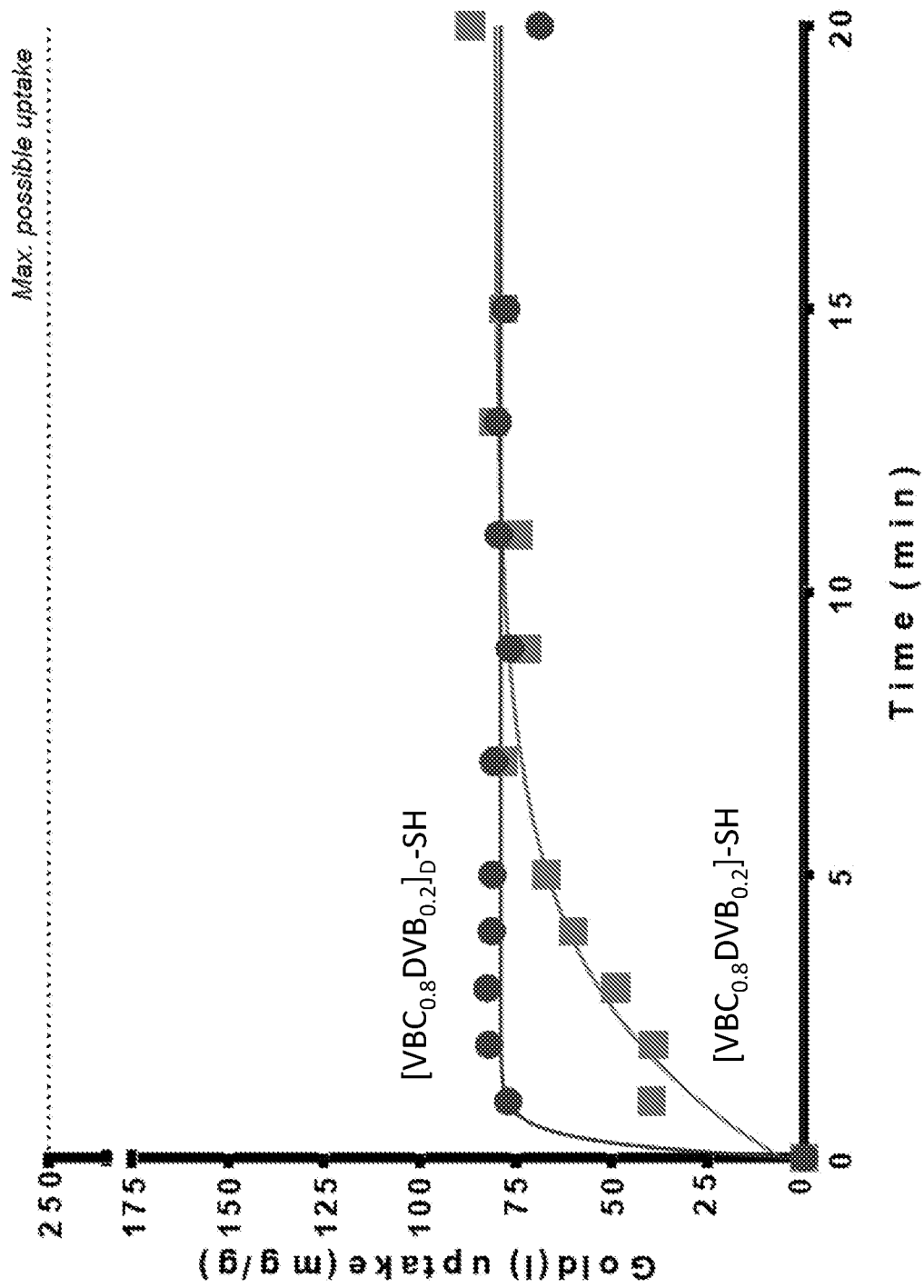
FIGS. 4A-4D depict $Au^1$ uptake data for all HCP—SH materials in the Example using an Au/S ratio of 0.97.
Figure 4B:
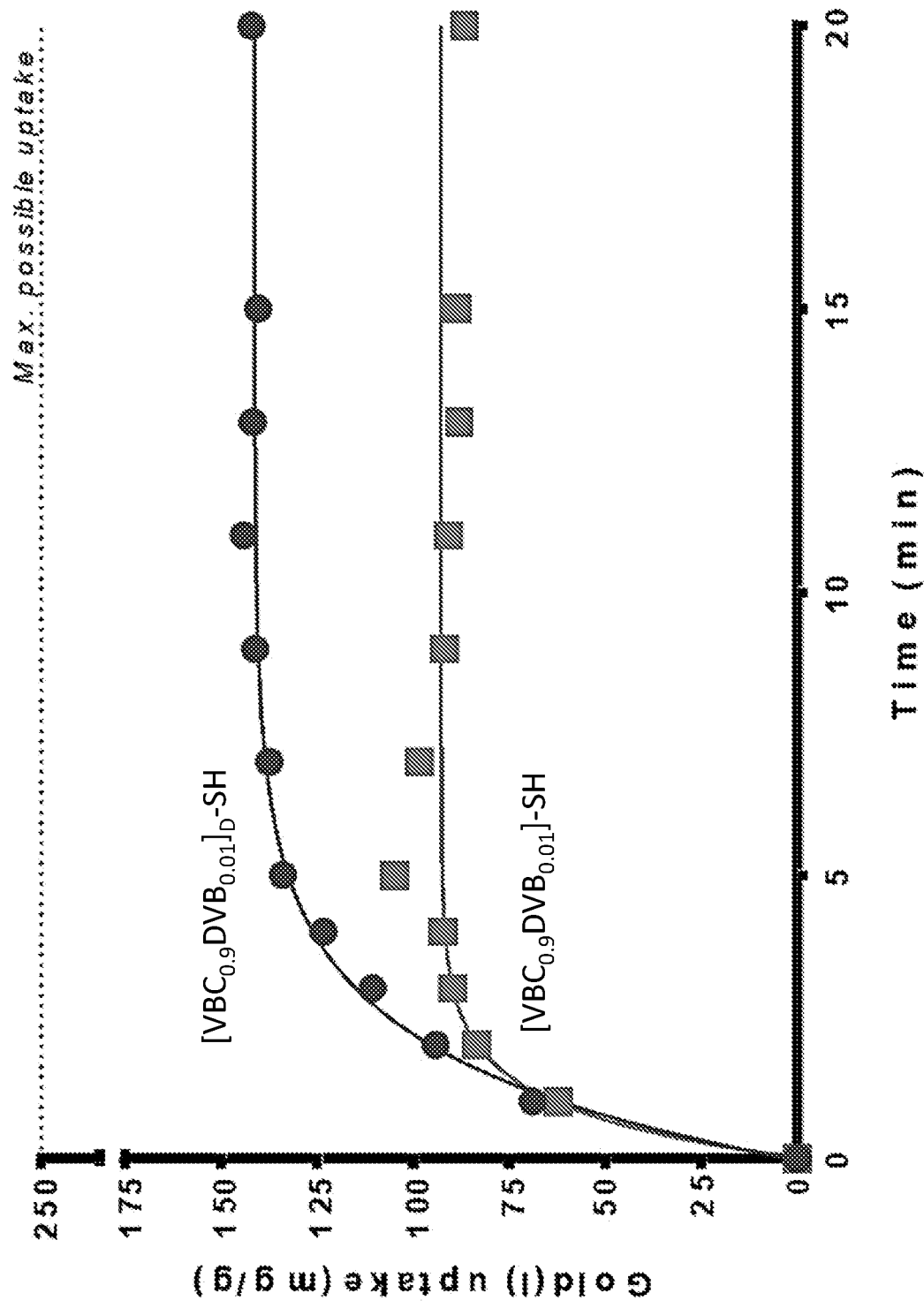
Figure 4C:
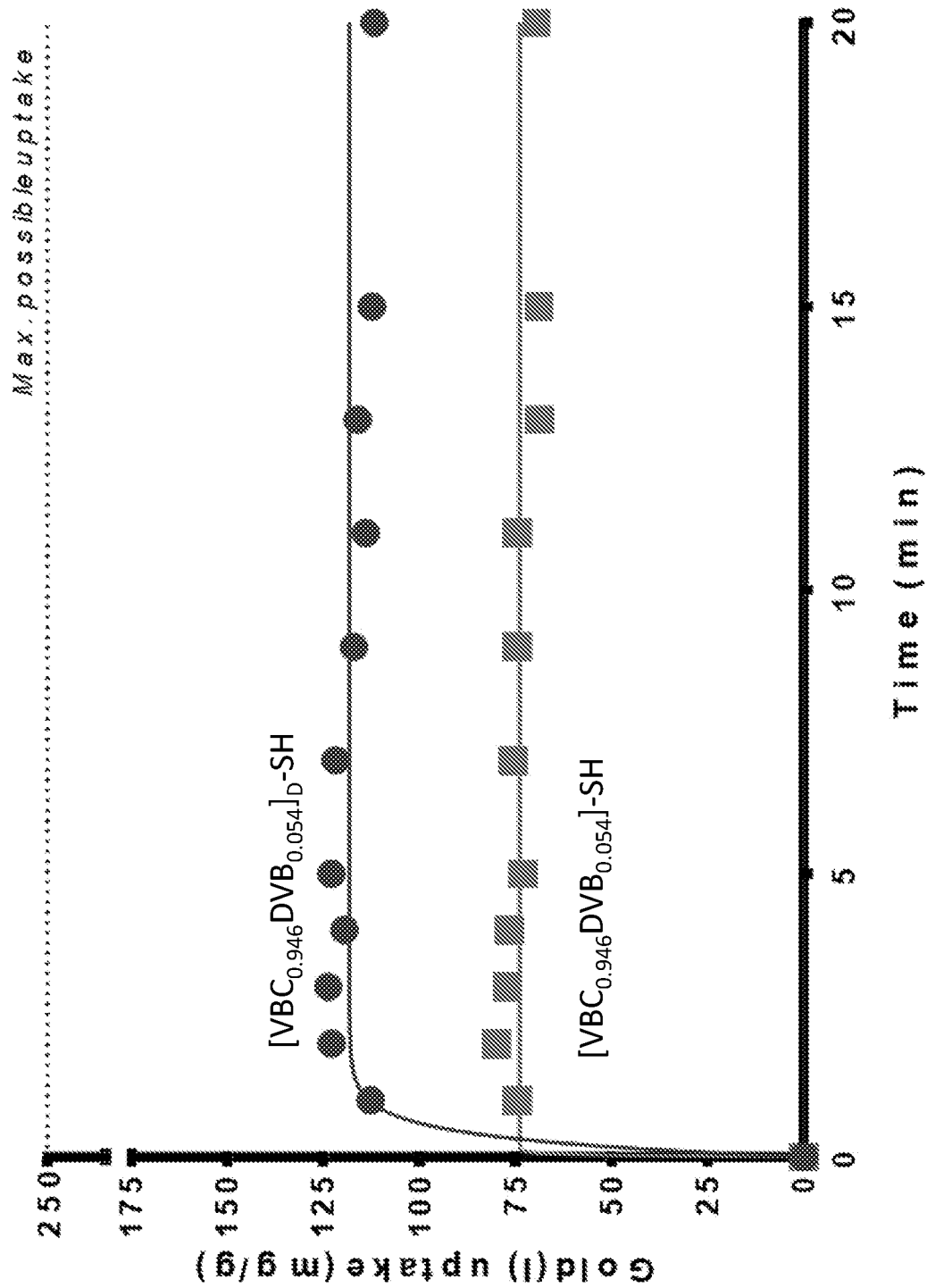
Figure 4D:
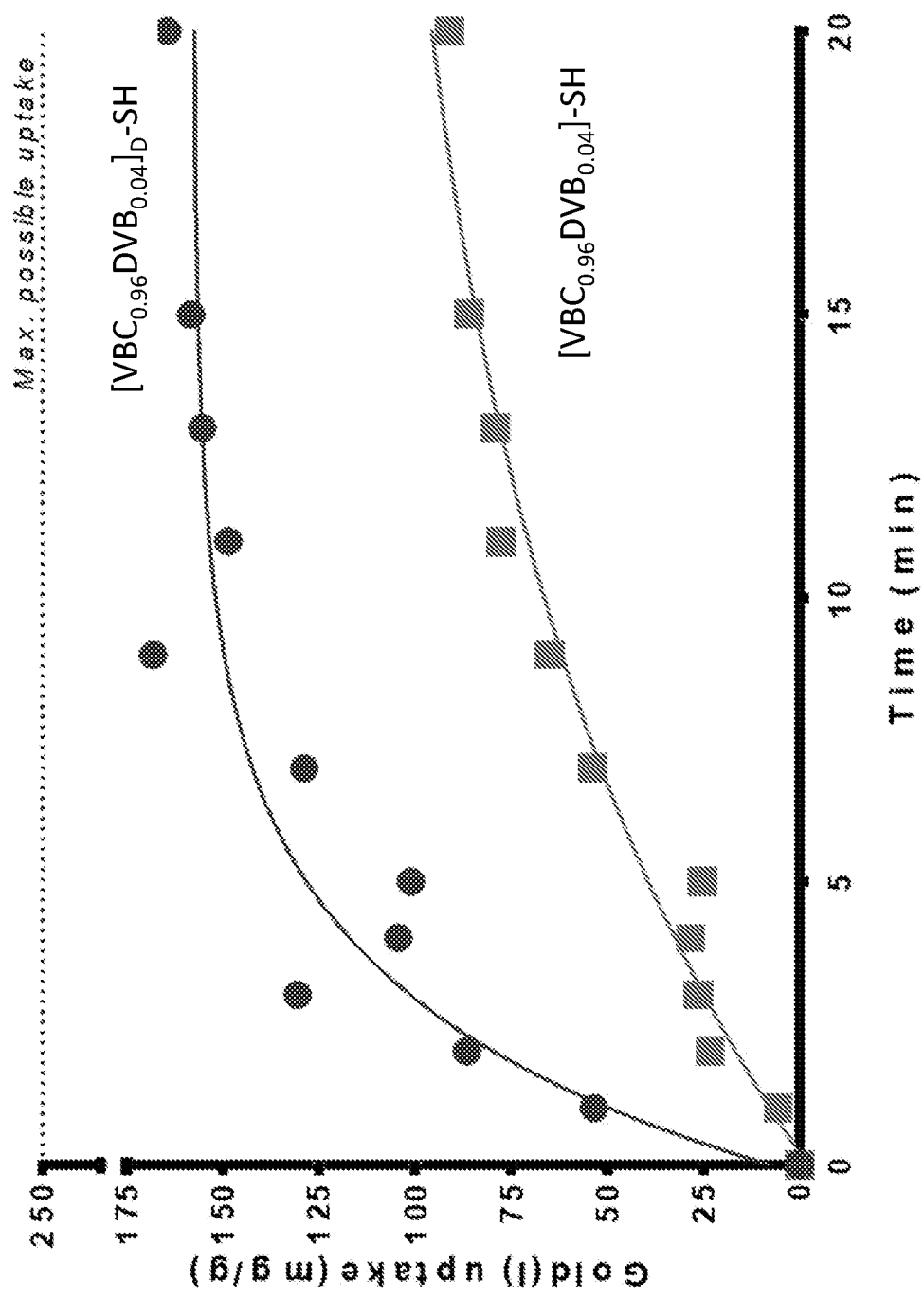
Figure 6B:
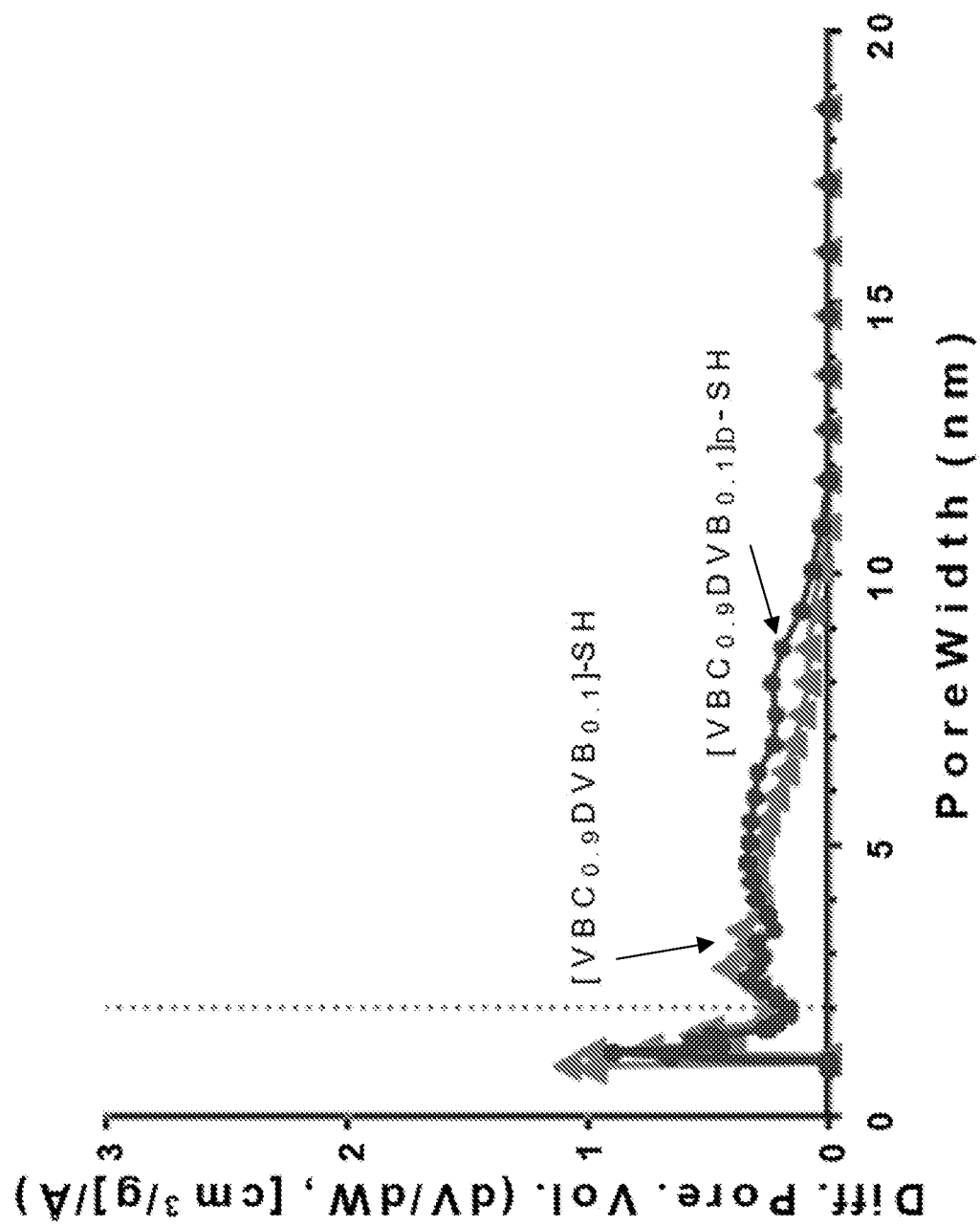
Figure 6C:
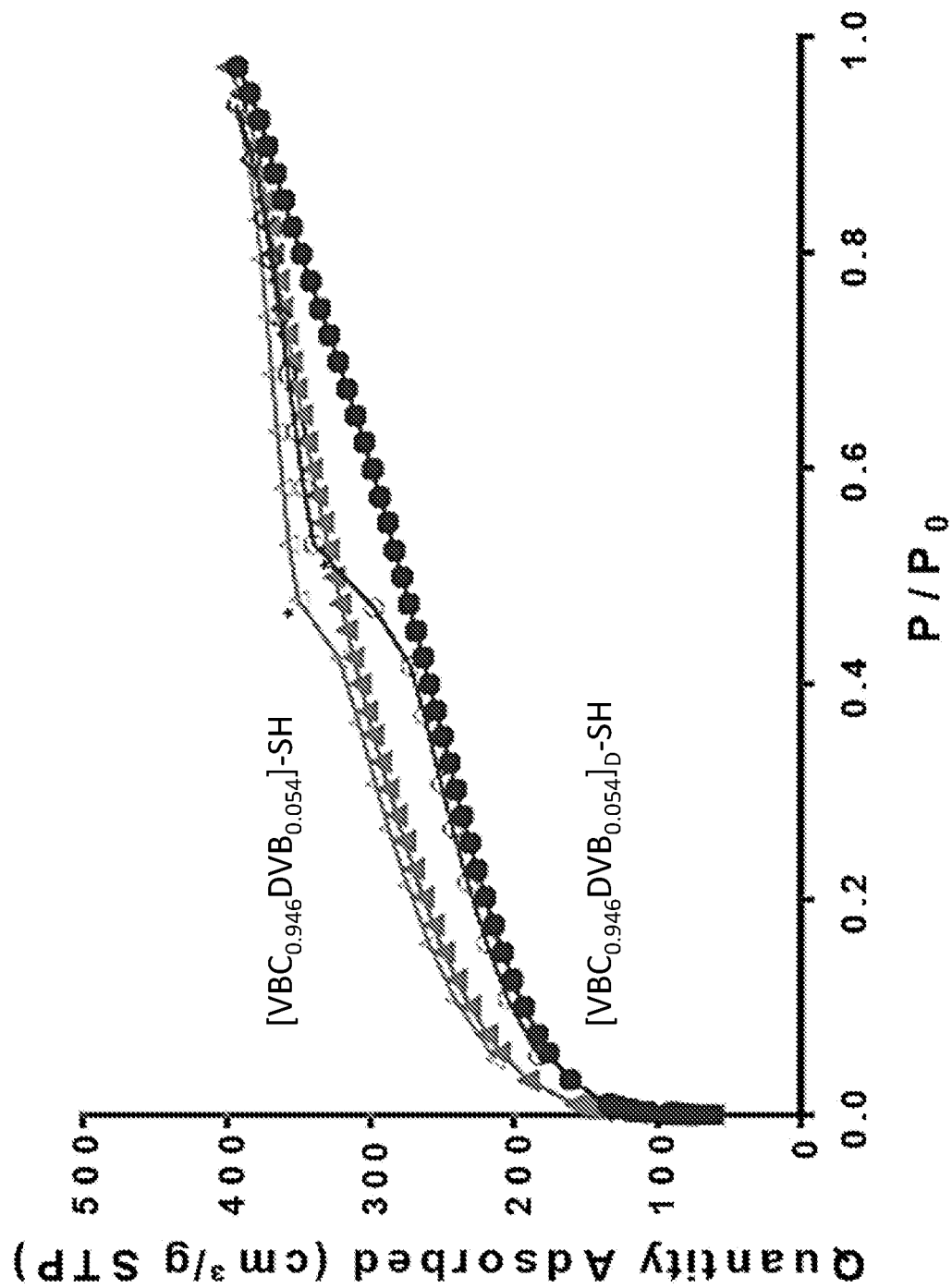
Figure 6D:
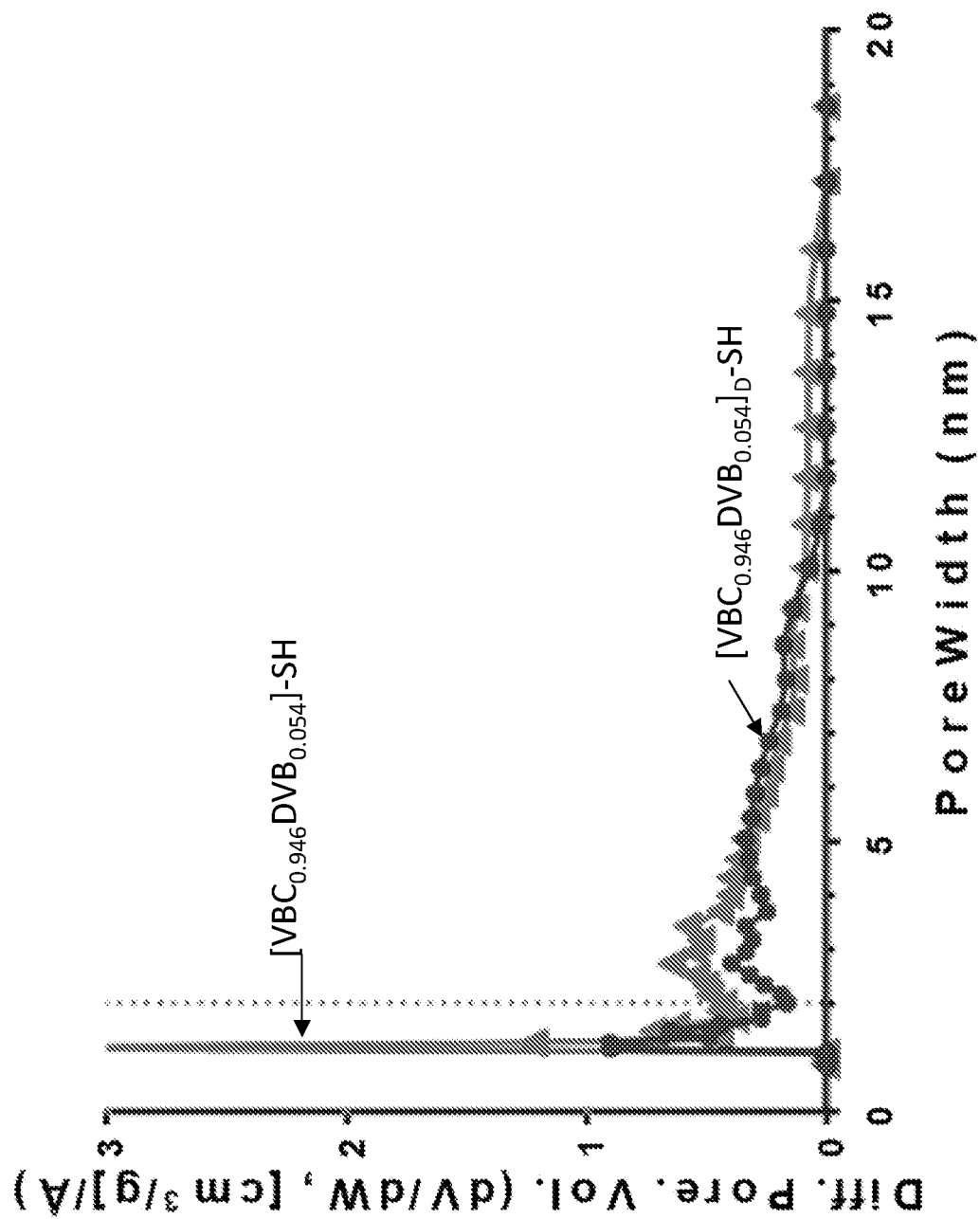

Employing dioxane as a porogen in step I of the HCP—SH synthesis (FIG. 2) produced a series of materials with more complex and interconnected pore structures, evidenced by their $N_2$ isotherms (FIG. 3A and FIGS. 6A and 6B). Without intending to be bound to any particular theory of the invention, this can be rationalized as a concentration-lowering effect in the [VBC+DVB] copolymerization step (FIG. 2, step I): dioxane dilutes the reaction mixture while maintaining polymer swelling, thus affording a polymer network with a lower crosslink density. Such a polymer will remain swollen during the subsequent Friedel-Craft hyper-crosslinking step (FIG. 2, step II), thus locking the final polymer network in its expanded state. The inclusion of dioxane had only a minor negative impact (8-18% decrease) on BET area (Table 1), though this was more pronounced for the low-DVB crosslinker materials like $[VBC_{0.96}DVB_{0.04}]_D$—SH. This can be attributed to these HCP—SH formulations forming less rigid polymeric networks during the initial copolymerization (FIG. 2, step I), making them more susceptible to shrinking/deforming when the dioxane was replaced with dichloroethane in the next step (FIG. 2, step II). Together with the change in comonomer stoichiometries, the data with dioxane shows that using dioxane as a porogenic solvent can provide an additional handle through which the relative proportion of micro- and mesopores can be tuned.

$Au^1$ Uptake by HCP—SH

The $Au^1$ capture properties of the polymer—SH were evaluated in a batch-adsorption fashion for the 8 HCP—SH materials. Photoluminescence (PL) and XPS studies were carried out on $[VBC_{0.8}DVB_{0.2}]_D$—SH before and after exposure to an acidic AuCl solution to delineate if the thiol groups on the HCP—SH interacted with $Au^1$ ions. The PL spectra confirms that adsorption occurred, as the thiol peak (550-850 nm) was strongly quenched following $Au^1$ exposure. XPS analysis of the post-exposure sample also indicates the presence of $Au^1$ ions, with an AU/S ratio of 1.05, as subsequently verified by inductively coupled plasma optical emission spectroscopy (ICP-OES). A shift in the —SH S(2p) XPS peak was not seen following $Au^1$ capture because the thiol moiety formed a dative bond with the AuCl complex and did not reduce to a sulphide anion.

Figure 5A:
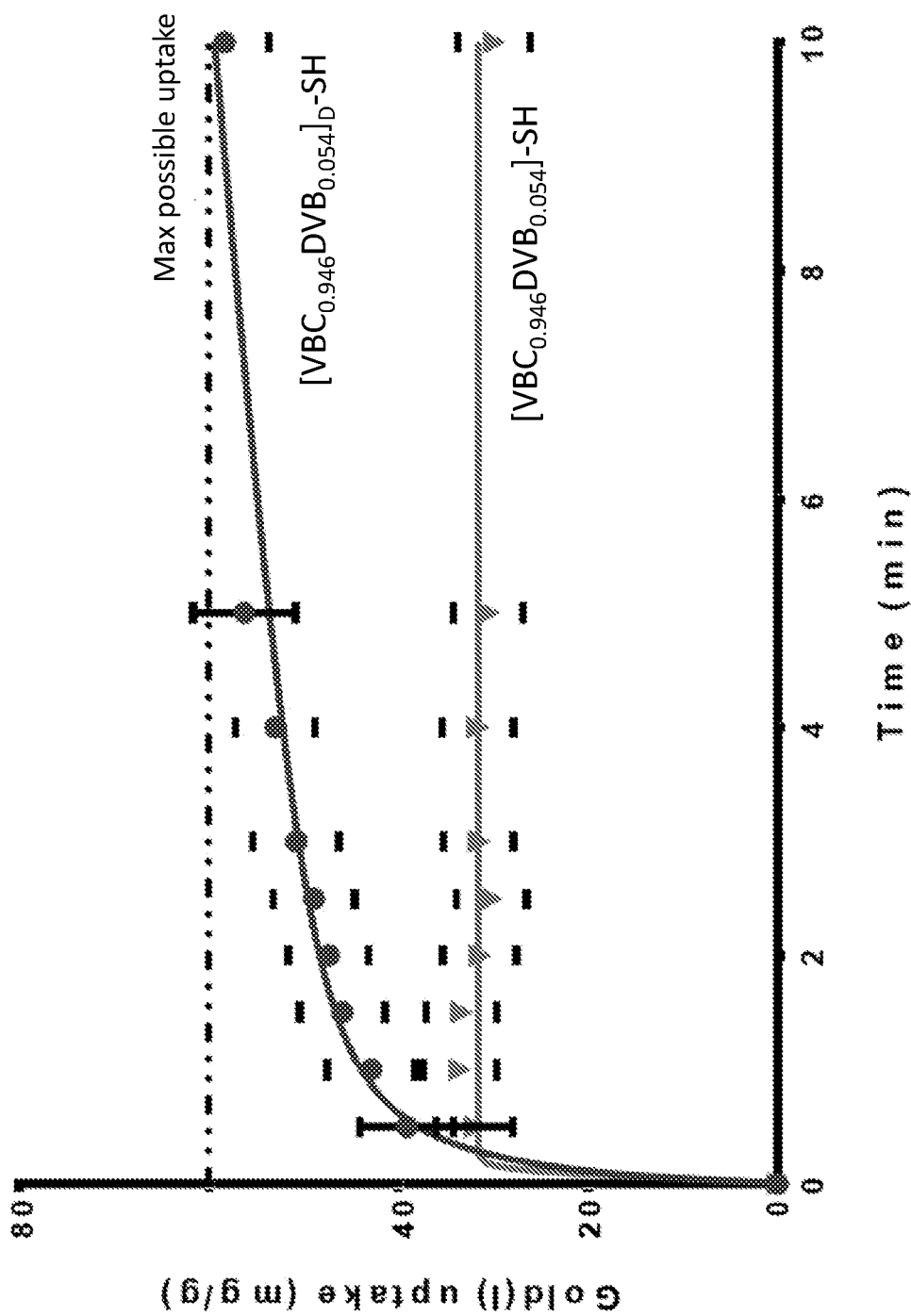
FIGS. 5A-5B depict $Au^1$ uptake data for hyper-crosslinked $[VBC_{0.946}DVB_{0.054}]_D$—SH and $[VBC_{0.946}DVB_{0.054}]$—SH (FIG. 5A) and hyper-crosslinked $[VBC_{0.9}DVB_{0.1}]$—SH and $[VBC_{0.9}DVB_{0.1}]_D$—SH (FIG. 5B) using an Au/S ratio of 0.16.
Figure 5B:
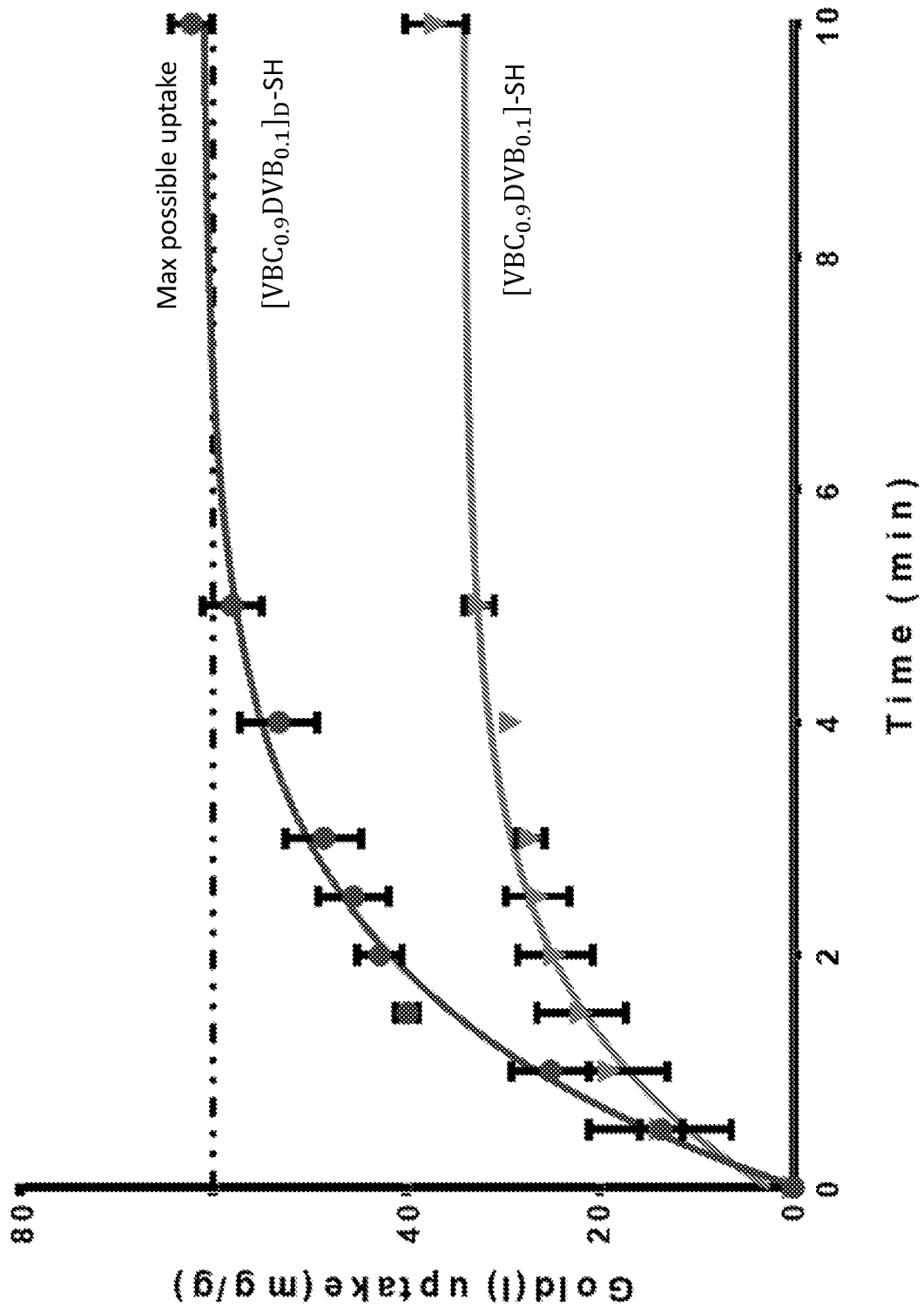

The dioxane-derived HCP—SH materials all have better $Au^1$-adsorption behaviors than their neat-polymer counterparts when being evaluated at an Au/S ratio of either 0.97 (FIGS. 4A-4D) or 0.16 (FIGS. 5A-5B). At an Au/S ratio of 0.16, $[VBC_{0.9}DVB_{0.1}]_D$—SH completely sequestered all the $Au^1$ ions in solution within 6 minutes (FIG. 5B), exhibiting an equilibrium adsorption capacity 2× that of its neat counterpart. These enhanced adsorption profiles can be attributed to mesopore-facilitated mass transport, which enables rapid access to binding sites on micropores. The lower-DVB (i.e., with 2, 5, and 10 mol % DVB) formulations additionally all have equilibrium adsorption capacities significantly greater than their neat counterparts, with $[VBC_{0.9}DVB_{0.1}]_D$—SH boasting a capacity approximately 2× that of $[VBC_{0.9}DVB_{0.1}]$—SH. This dioxane-induced performance improvement occurs despite both materials sharing similar proportions of mpv and mesopore volume (Mpv), with respect to their tpv (Table 1, cf entries 7 and 8), due to dioxane favoring the production of larger mesopores (FIGS. 3B, 3D, 6B, and 6D). Thus, dioxane is even effective at improving the $Au^1$-capture properties of HCP—SHs that already have an ~50:50 mpv:Mpv ratio when synthesized neat.

At the 0.97 Au/S ratio, both $[VBC_{0.8}DVB_{0.2}]$—SH and $[VBC_{0.8}DVB_{0.2}]_D$—SH exhibit the lowest equilibrium adsorption capacities amongst the entire HCP—SH library (FIG. 4A), though the neat HCP—SH shows a markedly retarded initial uptake rate. Given that these two materials share near-identical BET areas (590 and 540 $m^2/g$, respectively; Table 1), the discrepancy in performance can be explained by considering the differences in their psd. Whereas $[VBC_{0.8}DVB_{0.2}]_D$—SH has a combination of micro- and mesopores, $[VBC_{0.8}DVB_{0.2}]$—SH is purely microporous (see FIGS. 3A and 3B), which demonstrates that the lack of mesoporosity can severely limit the mass transport of $Au^1$ ions to the —SH binding sites in micropores. These results show that tailoring the HCP—SH material to favor a larger proportion of mesopores augments its adsorption performance via both improved uptake kinetics and total capacity.

$Au^1$ Desorption from the HCP—SH Using Thiourea Ligand-Exchange

To position the HCP—SH material as an attractive $Au^1$-capture material, it must be easily regeneratable and able to withstand multiple reuse cycles without significant performance degradation. To accomplish this, it was first necessary to design a strategy to remove captured $Au^1$ from the HCP—SH.

To this end, $Au^1$-treated $[VBC_{0.96}DVB_{0.04}]_D$—SH, the best-performing adsorbent, was exposed to an environmentally friendly mixture of [10 wt % thiourea in HCl (0-6 N)]. By evaluating the relation between [HCl] and Au-removal efficacy, a desorption solution composition can be selected that balances the benefits afforded by improved regeneration performance against safety and environmental risks.

The results reveal that higher [HCl] clearly promotes higher $Au^1$ removal, with the 6 N HCl mixture releasing 82% of the adsorbed gold into solution compared to the meager 7% desorbed by the thiourea-only solution (Table 3). This interdependence between pH and desorption efficiency occurs due to the chloride anions in HCl facilitating the removal of adsorbed $Au^1$ ions. The regenerated $[VBC_{0.96}DVB_{0.04}]_D$—SH displays excellent reusability and consistently retained ~80% of its original adsorption capacity through at least nine cycles of regeneration and reuse (Table 4), indicating its remarkable stability.

TABLE 3

Desorption of $Au^I$ from $[VBC_{0.96}DVB_{0.04}]_D$-SH using 10 wt % thiourea ligand exchange solution in varying amounts of HCl.

| 10 wt % thiourea in: | DI Water | 2N HCl | 4N HCl | 6N HCl |
| --- | --- | --- | --- | --- |
| First 10 mL eluent | 3.11 | 20.94 | 27.12 | 69.03 |
| Second 10 mL eluent | 2.34 | 3.57 | 12.51 | 12.51 |
| Third 10 mL eluent | 1.26 | 0.09 | 0.00 | 0.00 |
| Fourth 10 mL eluent | 0.00 | 0.00 | — | — |
| Fifth 10 mL eluent | 0.00 | 0.07 | — | — |
| Total % Au desorbed | 6.71 | 24.68 | 39.63 | 81.53 |

TABLE 4

Amount of $Au^I$ adsorbed (in %) by $[VBC_{0.96}DVB_{0.04}]_D$-SH over multiple cycles of regeneration and reuse using 10 wt % thiourea ligand exchange solution in 6N HCl and a 0.16 Au/S $Au^I$ solution. All cycles were carried out at room temperature.

| Cycles: | % max $Au^I$ adsorption capacity retained |
| --- | --- |
| Initial Uptake | 96 |
| $1^{st}$, 20 mL total eluent | 96 |
| $2^{nd}$ | 79 |

TABLE 4-continued

Amount of $Au^I$ adsorbed (in %) by $[VBC_{0.96}DVB_{0.04}]_D$-SH over multiple cycles of regeneration and reuse using 10 wt % thiourea ligand exchange solution in 6N HCl and a 0.16 Au/S $Au^I$ solution. All cycles were carried out at room temperature.

| Cycles: | % max $Au^I$ adsorption capacity retained |
| --- | --- |
| 3rd | 79 |
| 4th | 80 |
| 5th | 78 |
| 6th | 79 |
| 7th | 80 |
| 8th | 78 |
| 9th | 79 |

Materials and Methods

Unless otherwise stated, all reagents were used as received from either Aldrich Chemical Company, Inc. (Milwaukee, WI) or VWR, now owned by Avantor Performance Materials. LLC. (Center Valley, PA). 4-Vinylbenzyl chloride (VBC, 90% pure, contains 1000 ppm tert-butylcatechol as inhibitor). Divinylbenzene (DVB, technical grade, a mixture of 3- and 4-isomers, 80% pure (remainder ethylvinylbenzene and diethylbenzene, contains 1000 ppm tert-butylcatechol as inhibitor). Gold and sulfur ICP standards were purchased from Sigma-Aldrich Co. LLC (St. Louis, MI). Iron ICP standards were purchased from Ricca Chemical Company (Arlington, TX). Thiourea was purchased from Alfa Aesar (Ward Hill, MA). Ultrapure deionized (DI) water (18.2 MΩ cm resistivity) was obtained from a Millipore system (EMD Millipore, Billerica, MA). Solvents were purchased from either Sigma-Aldrich Co. LLC (St. Louis, MI), Fisher Scientific, Inc. (Pittsburgh, PA), or Avantor Performance Materials, Inc. (Center Valley, PA) and used as received. All the gases used for the adsorption and desorption measurements were ultra-high purity grade 5 and were obtained from Airgas Specialty Gases (Chicago, IL).

$N_2$-adsorption and -desorption isotherms were measured on a Micromeritics Tristar II 3020 (Micromeritics Instrument, Corp., Norcross, GA) at 77 K. Before each run, samples were activated at 120° C. for 24 h under high vacuum on a Schlenk line. Approximately 60-100 mg of sample was used in each measurement. The specific surface areas for $N_2$ were calculated using the BET model in the range of $0.005<P/P_0<0.1$. The pore volumes, pore areas (Table 2), and pore size distributions of the HCP were calculated from the adsorption-desorption isotherms by density functional theory (DFT) using the carbon slit-pore $N_2$ NL-DFT model. (See, e.g., Cychosz, K. A., et al., Recent advances in the textural characterization of hierarchically structured nanoporous materials. *Chem. Soc. Rev.* 2016, 45, 3400-3400.)

ICP-OES analyses were conducted on a Thermo Scientific™ iCAP™ 7600 ICP-OES spectrometer (Thermo Fisher Scientific, Inc., Waltham, MA) located in the QBIC facility of Northwestern University (NU). This instrument is equipped with a high-performance solid-state CID86 chip detector, dual view (radial and axial) capability, and an argon plasma to cover the 166-to-847 nm spectral range. This was used to analyze the supernatants from the Au-adsorption batch experiments (for Au content), the acid-digested HCP—SH samples (for S content), and the digested supernatants from the gold-desorption batch experiments (for Au and S content).

In a typical HCP—SH digestion, a thiolated HCP sample (2-5 mg) was combined with a digestion solution comprising conc. nitric acid (850 μL) and hydrogen peroxide (30 wt %, 250 μL) in a 10-20 mL microwave vial. The tube was capped and digested via microwave irradiation at 180° C. for 30 min. If the sample was not clear at the end of this period or still had suspended particles, additional hydrogen peroxide (30 wt %, 150 μL) was added and the sample was recapped and subject to the same digestion condition. This addition of extra hydrogen peroxide can be repeated as needed, typically 1-2 times per sample. Once the digested mixture turned clear, it was diluted to 25 mL with DI $H_2O$ using a 5 mL Eppendorf mechanical pipette. This was analyzed for S at the following wavelengths: 80.731 nm (axial), 182.034 nm (axial), and 182.624 nm (axial). The obtained intensities were compared to a calibration curve comprised of standards over a range of concentrations prepared from a 1000 ppm stock sulfur solution in $HNO_3$.

Centrifugation was carried out in an Eppendorf Centrifuge 5804 R, Model AG 22331 (Eppendorf AG, Hamburg. Germany) equipped with an F34-6-68 rotor. Unless otherwise stated, all centrifugations were carried out at 5000 rpm (3214 g) for 20 minutes.

XPS measurements were carried out at the Keck-II/NUANCE facility at NU on a ESCALAB 250 Xi instrument (Thermo Fisher Scientific Inc., Waltham, MA) (Al Kα radiation, hv=1486.6 eV) equipped with an electron flood gun. XPS data was analyzed using Thermo Scientific Advantage Data System software (v5.926) and all spectra were referenced to the adventitious Cls peak (284.5 eV).

$^{13}C$ CP-MAS NMR spectra were recorded on a Varian VNMRS 400 MHz (399.843 MHz for $^1H$, 100.55 MHz for $^{13}C$) spectrometer (Varian, Inc., Palo Alto, CA, USA) equipped with a 3.2-mm HXY T3 PENCIL probe. The samples were packed into a standard 3.2-mm (external diameter) zirconia rotor capped with a Teflon spacer. The spinning rate was at 20 kHz. Approximately 14,000-15,000 scans were acquired for each spectrum. $^{13}C$ NMR chemical shifts are reported in ppm downfield relative to tetramethylsilane (TMS) as zero ppm, calibrated using adamantane (38.3 ppm) as a secondary standard. All the spectra were acquired with neat powdered samples at room temperature (rt). All the data were processed by MestReNova Version 11.0.2-18153 software (Mestrelab Research SL. Escondido, CA, USA) with a line broadening of 20 Hz.

Scanning electron microscopy (SEM) images were obtained at NU's EPIC/NUANCE facility on a SU8030 FE-SEM (Hitachi High Technologies America, Inc., Dallas, TX) microscope with an acceleration voltage of 10 kV. The samples were finely ground and dispersed onto a double-sided carbon tape (Ted Pella. Inc., Redding, CA) attached to a flat aluminum sample holder. Prior to imaging. HCP—SH samples were coated with a film of Au/Pd (~20 nm thickness) using a Denton Desk III TSC Sputter Coater (Denton Vacuum, Inc., Moorestown, NJ).

Thermogravimetric analysis (TGA) experiments were carried out on a SDTA 851 (Mettler Toledo TGA, Inc., Mississauga, Canada) equipped with a small furnace. Samples (~3-5 mg) were loaded in 70 μL alumina pans and heated from 50 to 1000° C. under an $N_2$ gas flow (50 mL/min) at a heating rate of 10° C./min.

XRF analysis was carried out on an energy-dispersive XRF spectrometer (EX-2600 Ex-Calibur Xenematrix) equipped with a Rh X-ray tube. The X-ray tube of the spectrometer was operated at 15 kV and 0.5 mA, and radiation was filtered by a Ni foil to eliminate the Rh L-lines from the spectra that overlapped with Cl K-lines. Powder of each sample was placed on top of a 6 μm thin Mylar film which was supported in a 40 nm plastic cap. Spectra were collected under vacuum at rt for a live time of 180 s (dead time of detector was ~30%).

PL studies were carried out at NU's SPID facility on a HORIBA LabRAM HR Evolution Confocal RAMAN System using a 532 nm laser at 0.01% strength with a magnification of 10×. Wavelengths from 300-1200 nm were scanned, with a 2 s acquisition time. The samples were finely ground and dispersed onto a glass microscope slide. The spectrum for HCP—SH with bound $Au^1$ was obtained by analyzing a sample of $[VBC_{0.8}DVB_{0.2}]$—SH following the $Au^1$-uptake experiments.

Synthesis of Hyper-Crosslinked Polymer (HCP)

The syntheses in this section were modified from the procedure reported by Li et al. (See, e.g., Li, B., et al., Tailoring the pore size of hyper-crosslinked polymers. *Soft Matter* 2011, 7 (22), 10910-10916.)

Before a typical polymerization, the VBC (~3 mL) and DVB (~3 mL) comonomers were passed through basic alumina columns (8 mm internal diameter×20 mm) to remove the catechol inhibitors. These purified comonomers were then used to synthesize different HCP formulations using one of the protocols described below. These formulations differed in the mol % of the DVB co-monomer, and/or in the use of solvent (with or without dioxane in step I, FIG. 2); they were differentiated by using the following notation: $[VBC_xDVB_y]_z$, where x and y represent the mol % of VBC or DVB used for the initial copolymerization respectively, and z, if present, indicates the use of dioxane (D).

Synthesis of DVB-VBC Copolymer:

Step 1: Copolymerization of VBC and DVB to Yield 1.

In a typical neat-copolymerization experiment, appropriate amounts of VBC and DVB were combined with azobisisobutyronitrile (AIBN) (0.5 wt %). The reactant mixture was first subjected to 3 freeze-pump-thaw (FPT) cycles, then stirred under a nitrogen atmosphere for 12 h at 60° C. The resulting materials were then subjected to the hyper-crosslinking step (see below).

In a typical dioxane-added experiment, appropriate amounts of VBC and DVB were combined with AIBN (0.5 wt %), and 1,4-dioxane. The reactant mixture was first subjected to 3 FPT cycles, then stirred under a nitrogen atmosphere for 12 h at 60° C. The resulting materials were then subjected to the hyper-crosslinking step (see below).

$[VBC_{0.8}DVB_{0.2}]_D$: In a 150 mL Schlenk flask, VBC (0.82 mL, 0.89 g, 5.82 mmol) and DVB (0.20 mL, 0.19 g, 1.43 mmol) were combined with AIBN (0.5 wt %, 0.005 g) and 1,4-dioxane (8 mL). The reactant mixture was first subjected to 3 FPT cycles, then stirred under a nitrogen atmosphere for 12 h at 60° C. The resulting materials were then subjected to the hyper-crosslinking step (see below).

$[VBC_{0.8}DVB_{0.2}]$: In a 150 mL Schlenk flask, VBC (0.82 mL, 0.89 g, 5.82 mmol) and DVB (0.20 mL, 0.19 g, 1.43 mmol) were combined with AIBN (0.5 wt %, 0.005 g). The reactant mixture was first subjected to 3 FPT cycles, then stirred under a nitrogen atmosphere for 12 h at 60° C. The resulting materials were then subjected to the hyper-crosslinking step (see below).

$[VBC_{0.9}DVB_{0.1}]_D$: In a 150 mL Schlenk flask, VBC (1.69 mL, 1.78 g, 11.11 mmol) and DVB (0.170 mL, 0.16 g, 1.23 mmol) were combined with AIBN (0.5 wt %, 0.01 g) and 1,4-dioxane (12 mL). The reactant mixture was first subjected to 3 FPT cycles, then stirred under a nitrogen atmosphere for 12 h at 60° C. The resulting materials were then subjected to the hyper-crosslinking step (see below).

$[VBC_{0.946}DVB_{0.054}]$: In a 150 mL Schlenk flask, VBC (1.69 mL, 1.78 g, 11.11 mmol) and DVB (0.170 mL, 0.16 g, 1.23 mmol) were combined with AIBN (0.5 wt %, 0.01 g). The reactant mixture was first subjected to 3 FPT cycles, then stirred under a nitrogen atmosphere for 12 h at 60° C. The resulting materials were then subjected to the hyper-crosslinking step (see below).

$[VBC_{0.946}DVB_{0.054}]_D$: In a 150 mL Schlenk flask, VBC (1.82 mL, 1.98 g, 11.72 mmol) and DVB (0.085 mL, 0.054 g, 0.62 mmol) were combined with AIBN (0.5 wt %, 0.01 g) and 14-dioxane (12 mL). The reactant mixture was first subjected to 3 FPT cycles, then stirred under a nitrogen atmosphere for 12 h at 60° C. The resulting materials were then subjected to the hyper-crosslinking step (see below).

$[VBC_{0.96}DVB_{0.054}]$: In a 150 mL Schlenk flask, VBC (1.82 mL, 1.98 g, 11.72 mmol) and DVB (0.085 mL, 0.054 g, 0.62 mmol) were combined with AIBN (0.5 wt %, 0.01 g). The reactant mixture was first subjected to 3 FPT cycles, then stirred under a nitrogen atmosphere for 12 h at 60° C. The resulting materials were then subjected to the hyper-crosslinking step (see below).

$[VBC_{0.96}DVB_{0.04}]_D$: In a 150 mL Schlenk flask, VBC (0.923 mL, 1.05 g, 6.05 mmol) and DVB (0.017 mL, 0.01 g, 0.12 mmol) were combined with AIBN (0.5 wt %, 0.054 g) and 1,4-dioxane (8 mL). The reactant mixture was first subjected to 3 FPT cycles, then stirred under a nitrogen atmosphere for 12 h at 60° C. The resulting materials were then subjected to the hyper-crosslinking step (see below).

$[VBC_{0.96}DVB_{0.04}]$: In a 150 mL Schlenk flask, VBC (0.923 mL, 1.05 g, 6.05 mmol) and DVB (0.017 mL, 0.01 g, 0.12 mmol) were combined with AIBN (0.5 wt %, 0.005 g). The reactant mixture was first subjected to 3 FPT cycles, then stirred under a nitrogen atmosphere for 12 h at 60° C. The resulting materials were then subjected to the hyper-crosslinking step (see below).

Step 2: Hyper-Crosslinking the VBC-DVB Copolymer to Yield 2.

In a typical reaction, the reaction mixture containing the aforementioned copolymer was allowed to cool to rt. If the synthesis was carried out in the presence of solvent (dioxane), the solvent could be removed under vacuum, yielding the DVB-VBC copolymer in the form of large, white particles. If the synthesis was carried out neat, the copolymer congealed into a hard, white chunk at the end of the reaction. In either case, the copolymer had to be broken up into smaller particles before the hyper-crosslinking could be accomplished. For this purpose, 1,2-dichloroethane (16 mL, or enough to cover all the copolymer) was added to a Schlenk flask containing 1 g of the copolymer. The flask was stoppered, and the mixture was kept overnight, during which time the copolymer pieces softened, allowing them to be ground up into significantly smaller pieces the next day using a spatula. Some solvent still remained in the flask at this point.

In the next step, iron (III) chloride (1.08 g) was added to the flask containing the swollen, broken-up resin pieces, and the mixture was stirred at 80° C. for 18 h to hyper-crosslink the copolymer, yielding a dark-brown, fluffy powder. The reaction mixture was next combined with a 4/1 v/v ethanol: conc. HCl mixture, enough (~12-15 mL) to cover the powder. The resulting mixture was then allowed to stir at rt for 2 h before being vacuum-filtered over a Buchner funnel. The collected HCP materials were washed with a copious amount of ethanol (~200 mL) and water (~150 mL) directly on the funnel until the filtrate appeared clear. The collected material was then allowed to air-dry, affording the product as a light-brown, almost orange, powder (~1 g).

Chloromethylation and Thiol-Functionalization of HCP to Yield HCP—SH

The procedures for chloromethylation (yielding polymer structure 3) and NaSH-based thiol-functionalization (yielding polymer structure 4) were adapted from a paper published by Li et al. (Li et al., *Nat. Commun.* 2014, 5, 5537-5537.) The procedure for thiourea-based thiolation (yielding polymer structure 5) was adapted from a paper published by Lezzi et al. (Lezzi et al., *J. Polym. Sc., Part A: Polym. Chem.* 1994, 32 (10), 1877-1883.)

Chloromethylation of HCP to yield 3. A 250 mL round-bottom flask equipped with a magnetic stir bar and a water-cooled reflux condenser was charged with the previously synthesized HCP (~1 g), paraformaldehyde (3.3 g, 1.08 mol in monomeric form), conc. HCl (70 mL), conc. $H_3PO_4$ (30 mL), and glacial acetic acid (21.7 mL). The reaction mixture was heated at 90° C. for 3 days, after which the HCP was carefully collected by vacuum filtration over a Buchner funnel and directly washed with copious amounts of ethanol and DI water directly on the funnel. The collected material was then allowed to air-dry, affording a light-brown powder (~1 g).

Thiol-functionalization using NaSH to yield 4. A 250 mL round-bottom flask equipped with a magnetic stir bar and a water-cooled reflux condenser was charged with the chloromethylated HCP (~0.8 g), NaSH (4.0 g, 0.0713 mol), and ethanol (~30 mL). The reactant mixture was heated at 75° C. for three days. Following this, the HCP—SH was then washed with ethanol, separated via vacuum filtration using a Büchner funnel, subject to 3× Soxhlet extractions in methanol for 12 h each, washed with ethanol, vacuum-filtered, and air-dried to yield a light brown product (~0.7 g).

Thiol-functionalization using thiourea to yield 5. A 150 mL two-neck round-bottom-flask equipped with a magnetic stir bar, and a water-cooled reflux condenser was charged with the chloromethylated HCP (0.5 g), thiourea (2.5 g, 0.033 mol), and a 3/1 v/v mixture of ethanol and dioxane (~12 mL). This mixture was heated at 80° C. for 30 h. Following this, while continuing heating, the reaction mixture was sparged with nitrogen while 10 N NaOH (1.0 g of NaOH pellets dissolved in 3 mL water) was added via a syringe through one of the necks under positive pressure. This was heated at 80° C. for 6 h under a $N_2$ atmosphere, bubbling with nitrogen the whole time, after which the reaction mixture was allowed to cool to rt (~23° C.). After the contents of the flask had cooled to rt, conc. HCl (2 mL) was added in the same manner as the sodium hydroxide, and the reaction mixture was stirred for 2 h at rt. The mixture was washed with ethanol and vacuum filtered using a Buchner funnel, affording a dark-brown powder, which was subjected to 3× Soxhlet extractions in methanol for 12 h each, washed with ethanol, vacuum-filtered, and then air dried, yielding a light-brown powder (~0.4 g).

Evaluating both methods of thiol-functionalization. Both the NaSH-functionalized and thiourea-functionalized $[VBC_{0.8}DVB_{0.2}]_D$—SH were exposed to a 1:1 Au/S of $Au^1$, and the amount of $Au^1$ adsorbed by each polymer was quantified using ICP-OES (method described below). The NaSH-based HCP—SH (4) and the thiourea-based HCP—SH (5) displayed incongruous $Au^1$ uptakes: 5 adsorbed 25% more gold than 4. To test if this difference was due to the formation of either thioethers or disulfide linkages, both HCP—SH samples were treated with dithiothreitol (DT), which reduces R—S—S—R and R—S—R functional groups back to the thiol (R—SH). Following the DTT treatment, 4 displayed a 20% increase in $Au^1$ uptake, while there was no change in 5.

Preparation of HCP—SH—Au. In a typical preparation, a 50 mL centrifuge tube equipped with a micro stir bar was charged with the appropriate HCP—SH (10 mg HCP—SH, approximately 6 wt % S content) and an $Au^1$ solution of a known concentration (3:1 Au:S, 15 mL of a 1000 ppm solution). The tube was capped and the resulting mixture was vigorously stirred. At t=12 and 18 h, aliquots were drawn and analyzed for Au following the sampling protocol described below. If the two aliquots indicated $Au^1$ adsorption was still taking place, the suspension was left to stir vigorously for another 6 h, after which another aliquot was drawn and analyzed for gold. However, if the concentration of gold was relatively unchanged between the two timepoints, the suspended particles were isolated by filtering the contents of the centrifuge tube through a polytetrafluoroethylene (PTFE) syringe filter, allowing all the solid materials to be contained by the filter. Once all the materials were trapped by the PTFE filter, a Luer-lock syringe was used to rinse the solids with DI water (~15 mL), after which the solid-loaded PTFE was left to air dry. Once dry, the filter was clamped on a bench vice, and a hacksaw was used to carefully cut off the outer plastic casing and expose the PTFE filter paper and the solid material. The solid material (the HCP—SH—$Au^1$) was then carefully collected for further analysis.

Gold Batch-Adsorption Studies $Au^1$ solutions (20 mL) with predetermined concentrations of $Au^1$ (Au dissolved in 5% w/w HCl) were prepared prior to adsorption experiments by using the $Au^1$ ICP standard (1,000 ppm) as a stock solution. The required amount of the stock solution was pipetted into a 20 mL scintillation vial and was made up to 20 mL using 5% HCl. The pH values of these solutions were measured and determined to be ~2.4; it was found to remain constant for up to 3 months when the $Au^1$ solution was stored in capped scintillation vials. The Au concentrations were verified with ICP-OES at the beginning of each batch-adsorption experiment (t=0).

Sampling protocol. Gold batch-adsorption experiments were carried out in 50 mL VWR polypropylene centrifuge tubes. In a characteristic sampling experiment, a centrifuge tube equipped with a micro stir bar was charged with the HCP—SH (10 mg) and 60 ppm Au solution (20 mL, prepared as described above). The tube was capped and vigorously stirred to keep the HCP—SH finely dispersed. At specified time intervals, the tube was uncapped and an aliquot (~1 mL) was quickly drawn using a disposable syringe and 18-gauge needle. The needle was removed; the syringe was attached to a 0.2 μm PTFE syringe filter (VWR International, North American Cat. No. 28145-495); and the aliquot was then filtered into either a disposable 3 mL centrifuge tube or a 2-dram glass vial. An aliquot (500 μL) was then drawn from each filtrate sample using a pipette and diluted 10× in a 15 mL VWR polypropylene centrifuge tube using a 5% aq HCl solution. The collected liquid samples were then analyzed directly for Au using ICP-OES at the following wavelengths: 242.795 nm (radial), 267.595 nm (radial), 208.208 nm (axial), and 197.819 nm (axial). The obtained intensities were compared to a calibration curve prepared using standard Au solutions prepared from a stock 1000 ppm $Au^1$ solution in HCl.

Stability of the HCP—SH during sampling experiments. No leaching of sulfur was noted under the aforementioned sampling experiments. This was monitored by analyzing the gold-adsorption aliquots for S content using ICP-OES. XPS spectra of the HCP—SH after gold sorption showed no change in the position of the sulfur binding energy (~164 eV) compared to the HCP—SH before sorption.

TABLE 5

Amount of sulfur functionalized on each HCP-SH
(5) synthesized (measured using ICP-OES)

| HCP | Sulfur content (wt % ± 0.2) |
|---|---|
| [VBC$_{0.8}$DVB$_{0.2}$]$_D$-SH | 6.1 |
| [VBC$_{0.8}$DVB$_{0.2}$]-SH | 6.3 |
| [VBC$_{0.9}$DVB$_{0.1}$]$_D$-SH | 5.8 |
| [VBC$_{0.9}$DVB$_{0.1}$]-SH | 5.8 |
| [VBC$_{0.946}$DVB$_{0.054}$]$_D$-SH | 6.4 |
| [VBC$_{0.946}$DVB$_{0.054}$]-SH | 6.3 |
| [VBC$_{0.96}$DVB$_{0.04}$]$_D$-SH | 6.4 |
| [VBC$_{0.96}$DVB$_{0.04}$]-SH | 6.5 |

Figure 8:
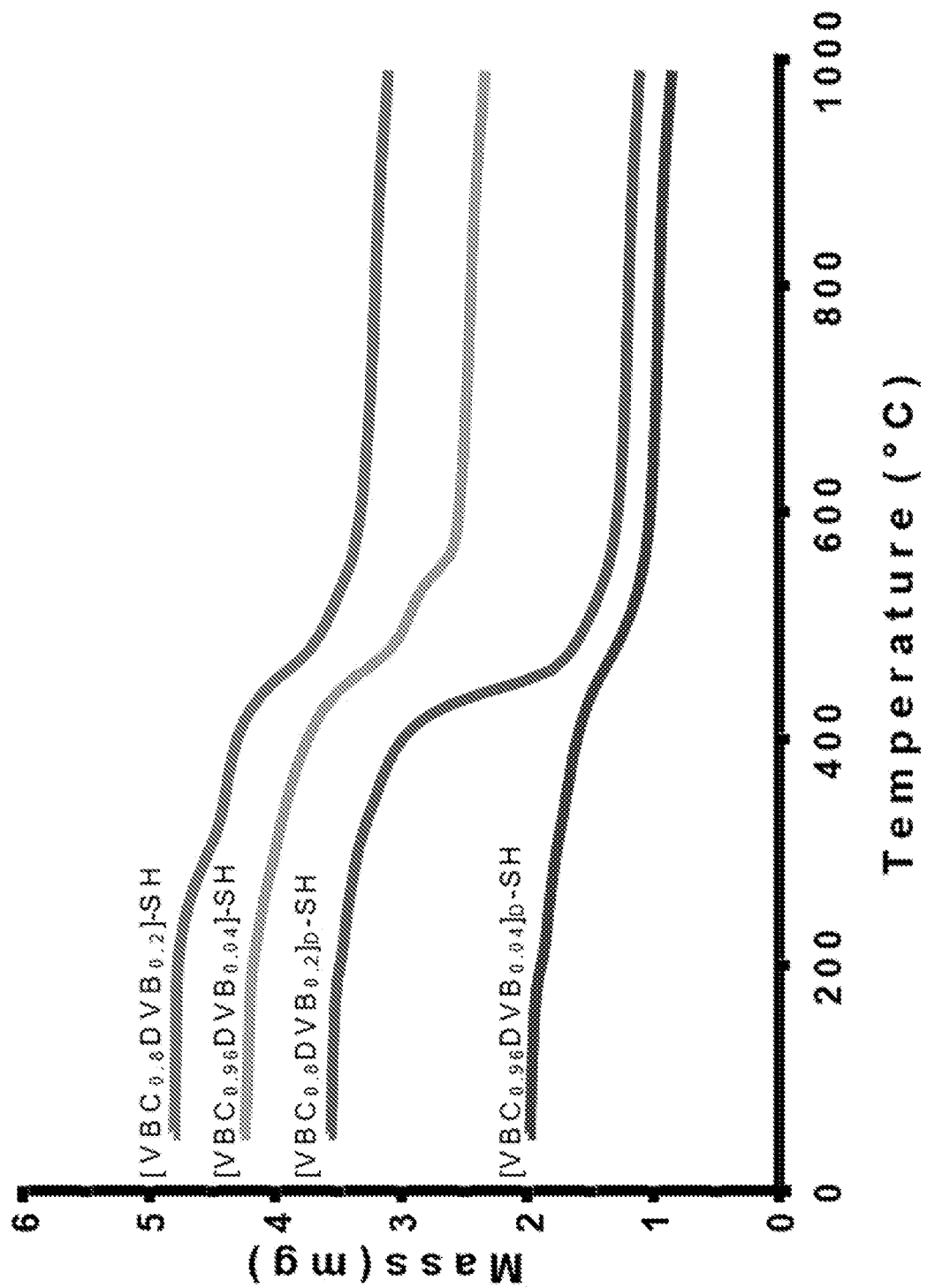
FIG. 8 depicts thermogravimetric profiles for four of the HCP—SHs synthesized in the Example.

TGAs were carried out on 2 of each of the HCP—SH formulations synthesized with and without dioxane, providing a representative library with which to describe the synthesized materials. These indicate that the HCP—SH polymer materials exhibit high thermal stability and do not decompose until ~400° C. (FIG. 8), rendering them suitable for gold-capture application.

Regeneration of the HCP—SH Post Au$^1$-Adsorption

Most treatments for gold removal from thiols focus on oxidizing the thiol to free the gold. This renders them unsuitable for reuse, and thus introduces an undesirable extra step post-desorption where the oxidized thiols will have to be reduced back to the thiol. Hence, a simpler desorption methodology using thiol ligand exchange is proposed, wherein the thiol-bound gold interfaces with a thiourea solution, and the gold is desorbed off the HCP—SH. Following this desorption, the structural and functional integrity of the HCP—SH is tested by resorbing Au to the thiols to test the effect of reuse on the capacity. The relevant data and experimental conditions are summarized in Table 3.

Desorption of Au from HCP—SH—Au. Desorption experiments were carried out in 50 mL polypropylene centrifuge tubes equipped with PTFE filter chambers (eCon lab Supply Centrifugal Filters, 0.22 µm PTFE, 23 mL; purchased on amazon.com: ASIN B01EIAXGV2). In a typical desorption experiment, the desorption solution was first prepared by combining thiourea (5 g) and one of either DI water (50 mL), 2 N HCl (50 mL), 4 N HCl (50 mL), or 6 N HCl (50 mL) in a 50 mL polypropylene centrifuge tube equipped with a micro stir bar, and stirring the mixture until all the thiourea dissolved. HCP—SH—Au (~10 mg) was prepared by adding [VBC$_{0.9}$DVB$_{0.1}$]—SH to the PTFE filter chamber of a 50 mL centrifuge tube equipped with a micro stirbar.

Step 1. Adsorption of Au$^1$ to the HCP—SH

An Au$^1$ solution (20 mL of a 180 ppm solution, 1:1 Au/S ratio) was added to the filtration chamber containing the HCP—SH resin and stir bar, after which the tube was capped and the mixture was vigorously stirred. At t=8 h, the mixture was centrifuged (5,000 rpm, 20 min, rt), affording HCP—SH—Au in the filtration camber. An aliquot of the filtrate was drawn and analyzed for Au$^1$ following the sampling protocol described above.

Following this, excess gold that had not been adsorbed was washed off the HCP—SH—Au by adding DI water (10 mL) to the filtration chamber and centrifuging the mixture. Again, an aliquot of the filtrate was collected as described above for Au$^1$ analysis. This was repeated 5× (or until the filtrate contained no residual Au$^1$ ions), and the amount of gold adsorbed onto the HCP—SH was calculated.

Step 2. Desorption of Au$^1$ from the Prepared HCP—SH—Au$^1$

A portion (10 mL) of the prepared desorption solution (composition of the desorption solutions is described in Table 3) was added to the filtration chamber containing the HCP—SH—Au, and the mixture was vigorously agitated using a shaker (Vari-whirl mixer set to 4). At t=4 h, the mixture was centrifuged as described in step 1, and an aliquot (500 µL) of the thiourea solution was collected and subjected to acid-digestion (refer to acid-digestion protocol described above, as well as the modifications described below). This process was repeated three more times using fresh desorption solution (10 mL), and another aliquot (500 µL) of the centrifuged thiourea solution was collected and digested for each additional exposure. The HCP—SH was rinsed with DI water (5×10 mL) following each exposure to the desorption solution. The digested aliquots were analyzed directly for Au using ICP-OES at the wavelengths described above. The obtained intensities were compared to a calibration curve prepared using prepared Au$^1$ standards to evaluate the efficacy of each desorption solution at removing captured Au$^1$ from the HCP—SH.

Assessing the recyclability, of the HCP—SH material using [10 wt % thiourea in 6 N HCl]. After the completion of step 2 (removing adsorbed Au$^1$), the retained resin was subjected to repeated cycles of Au$^1$ adsorption and desorption (steps 1 and 2, respectively) until the PTFE filter degraded (the most cycles achieved was 9). Desorption was carried out using the solution (10 mL) two times instead of four times. The collected aliquots from each cycle were digested and analyzed for Au$^1$ using ICP-OES.

Acid-digestion of desorption samples containing thiourea. A pipette was used to transfer 500 µL of the aliquot drawn from the desorption experiment into a 10-20 mL microwave vial equipped with a stir bar (a 10-20 mL microwave vial was used here to provide a large amount of head space, as the reactions in this digestion were quite vigorous and generated a lot of gas). The digestion procedure for these aliquots was consistent with what was followed to digest HCP—SH samples for S analysis—with the addition that the total amount of $H_2O_2$ used to digest the aliquot was ~700 µL. When digesting one of the regeneration solutions that used high concentrations of HCl, the conc. nitric acid (750 µL) was added, and then the hydrogen peroxide (30 wt %, 350 µL) was added drop-wise. The addition of $H_2O_2$ is highly exothermic, so there was vigorous effervescence as the solution turned orange. Once the contents of the vial settled, the solution sat loosely capped (i.e. the cap was placed on the vial but was not crimped) for 2 h at rt before additional hydrogen peroxide (30 wt %, 250 µL) was added and the cap was crimped on the vial. After this point, the HCP—SH digestion protocol was used for the rest of the procedure.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A crosslinked vinylbenzylchloride-divinylbenzene copolymer that is thiol-functionalized and has a mole ratio of vinylbenzylchloride monomer to divinylbenzene monomer in a range from 99:1 to 80:20, wherein the crosslinked vinylbenzylchloride-divinylbenzene copolymer comprises both mesopores and micropores and further wherein the mesopores make up at least 20% of a total pore volume of the crosslinked vinylbenzylchloride-divinylbenzene copolymer.

2. A method for extracting metal ions from a sample, the method comprising:
    contacting a thiol-functionalized crosslinked vinylbenzylchloride-divinylbenzene copolymer with a sample comprising metal ions, whereby the metal ions are adsorbed by the thiol-functionalized crosslinked vinylbenzylchloride-divinylbenzene copolymer; and
    removing the thiol-functionalized crosslinked vinylbenzylchloride-divinylbenzene copolymer with the adsorbed metal ions from the sample.

3. The method of claim 2, wherein the metal ions are $Au^1$ ions and the thiol-functionalized crosslinked vinylbenzylchloride-divinylbenzene copolymer adsorbs the $Au^1$ ions with an $Au^1$ uptake of at least 90% of a maximum possible $Au^1$ uptake.

4. The method of claim 2, wherein the thiol-functionalized crosslinked vinylbenzylchloride-divinylbenzene copolymer comprises mesopores and micropores.

5. The method of claim 4, wherein the thiol-functionalized crosslinked vinylbenzylchloride-divinylbenzene copolymer has a total pore volume comprising at least 40% mesopore volume.

6. The method of claim 5, wherein the mesopore volume makes up between 40% and 60% of the total pore volume.

7. The method of claim 2, wherein the thiol-functionalized crosslinked vinylbenzylchloride-divinylbenzene copolymer has a BET surface area of at least 500 m²/g.

8. The method of claim 2, wherein a mole ratio of vinylbenzylchloride monomer to divinylbenzene monomer in the thiol-functionalized crosslinked vinylbenzylchloride-divinylbenzene copolymer is in a range from 99:1 to 75:25.

9. The method of claim 2, wherein the metal ions comprise heavy metal ions.

10. The method of claim 9, wherein the heavy metal ions comprise gold ions, silver ions, copper ions, lead ions, mercury ions, cadmium ions, or a combination of two or more thereof.

11. The method of claim 9, wherein the heavy metal ions are gold ions.

12. A method of forming a thiol-functionalized crosslinked vinylbenzylchloride-divinylbenzene copolymer, the method comprising:
    copolymerizing vinylbenzylchloride monomers and divinylbenzene monomers into a vinylbenzylchloride-divinylbenzene copolymer in the presence of a porogenic solvent;
    crosslinking the vinylbenzylchloride-divinylbenzene copolymer;
    chloromethylating the vinylbenzylchloride-divinylbenzene copolymer to form a chloromethylated vinylbenzylchloride-divinylbenzene copolymer; and
    thiolating the chloromethylated vinylbenzylchloride-divinylbenzene copolymer using a thiourea to form the thiol-functionalized crosslinked vinylbenzylchloride-divinylbenzene copolymer.

13. The method of claim 12, wherein the porogenic solvent is dioxane, tetrahydrofuran, toluene, a xylene, or a combination of two or more thereof.

14. The method of claim 13, wherein the porogenic solvent is 1,4-dioxane.

15. The method of claim 12, wherein a mole ratio of vinylbenzylchloride monomer to divinylbenzene monomer in the thiol-functionalized crosslinked vinylbenzylchloride-divinylbenzene copolymer is in a range from 99:1 to 85:15.

16. The method of claim 12, wherein the thiolation of the chloromethylated vinylbenzylchloride-divinylbenzene copolymer is carried out in the presence of the porogenic solvent.

* * * * *